(12) United States Patent
Liu et al.

(10) Patent No.: US 9,936,534 B2
(45) Date of Patent: Apr. 3, 2018

(54) METHOD AND APPARATUS FOR DATA TRANSMISSION

(71) Applicant: Huawei Technologies Co., Ltd., Shenzhen (CN)

(72) Inventors: Jianning Liu, Shenzhen (CN); Patrice Hede, Shenzhen (CN); Anni Wei, Shenzhen (CN); Lei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 14/749,129

(22) Filed: Jun. 24, 2015

(65) Prior Publication Data

US 2015/0296559 A1    Oct. 15, 2015

Related U.S. Application Data

(63) Continuation of application No. PCT/CN2013/086638, filed on Nov. 6, 2013.

(30) Foreign Application Priority Data

Dec. 25, 2012 (CN) .......................... 2012 1 0571957

(51) Int. Cl.
*H04W 76/04*    (2009.01)
*H04L 29/06*    (2006.01)
(Continued)

(52) U.S. Cl.
CPC ....... *H04W 76/046* (2013.01); *H04L 41/0816* (2013.01); *H04L 41/5019* (2013.01);
(Continued)

(58) Field of Classification Search
None
See application file for complete search history.

(56) References Cited

U.S. PATENT DOCUMENTS 6,668,175 B1 * 12/2003 Almgren ................. H04L 47/14
                                                    455/516
6,751,227 B1 *  6/2004 Ahmavaara ....... H04W 72/0406
                                                    370/352
(Continued)

FOREIGN PATENT DOCUMENTS

CN    101116302 A    1/2008
CN    101287296 A   10/2008
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 10)," 3GPP TS 23.401, V10.1.0, pp. 1-271, 3rd Generation Partnership Project, Valbonne, France (Sep. 2010).

*Primary Examiner* — Candal Elpenord
(74) *Attorney, Agent, or Firm* — Leydig, Voit & Mayer, Ltd.

(57) ABSTRACT

The present invention discloses a data transmission method and apparatus. According to the present invention, when transmitting data by using a first radio bearer, a UE receives radio resource control connection reconfiguration information sent by a base station; the UE obtains a second radio bearer according to the radio resource control connection reconfiguration information; the UE sends radio resource control connection reconfiguration completion information to the base station; the UE transmits a part of the data which has not been transmitted by using the second radio bearer. The solutions provided by the embodiments of the present invention are suitable to be adopted during switch between an adaptive streaming mode and a progressive download mode.

14 Claims, 7 Drawing Sheets

(51) Int. Cl.
*H04W 76/02* (2009.01)
*H04L 12/14* (2006.01)
*H04W 28/16* (2009.01)
*H04W 36/26* (2009.01)
*H04L 12/24* (2006.01)
*H04W 28/24* (2009.01)

(52) U.S. Cl.
CPC ............ *H04L 65/60* (2013.01); *H04W 28/16* (2013.01); *H04W 36/26* (2013.01); *H04W 76/025* (2013.01); *H04W 28/24* (2013.01); *H04W 76/041* (2013.01)

(56) References Cited

U.S. PATENT DOCUMENTS

| | | |
|---|---|---|
| 2005/0025180 A1 | 2/2005 | Curcio et al. |
| 2006/0176966 A1 | 8/2006 | Stewart et al. |
| 2008/0132268 A1* | 6/2008 | Choi-Grogan ........ H04W 28/24 455/550.1 |
| 2009/0239526 A1* | 9/2009 | Zhao .................... H04W 60/06 455/424 |
| 2009/0252132 A1* | 10/2009 | Song ................... H04W 76/025 370/338 |
| 2011/0009124 A1* | 1/2011 | Kostic ................ H04W 76/025 455/450 |
| 2014/0078898 A1* | 3/2014 | Anchan ............ H04W 28/0268 370/230 |

FOREIGN PATENT DOCUMENTS

| | | |
|---|---|---|
| CN | 101370261 A | 2/2009 |
| CN | 101453719 A | 6/2009 |
| CN | 102098139 A | 6/2011 |
| CN | 102291787 A | 12/2011 |
| CN | 102612090 A | 7/2012 |

* cited by examiner

METHOD AND APPARATUS FOR DATA TRANSMISSION

CROSS-REFERENCE TO RELATED APPLICATIONS

This application is a continuation of International Patent Application No. PCT/CN2013/086638, filed on Nov. 6, 2013, which claims priority to Chinese Patent Application No. 201210571957.2, filed on Dec. 25, 2012, both of which are hereby incorporated by reference in their entireties.

FIELD OF THE INVENTION

The present invention relates to the technical field of communication networks, and particularly, to a data transmission method and apparatus.

BACKGROUND OF THE INVENTION

A mobile streaming media technology based on a hyper text transfer protocol (Hyper Text Transfer Protocol, HTTP) is widely recognized and supported because of the features of simple deployment, easy achievement of a terminal and the like. The manner of downloading a media file based on the HTTP protocol may be any one of an adaptive streaming Adaptive Streaming mode or a progressive download Progressive Download mode.

The Adaptive Streaming mode refers to that a media file is divided into multiple fragments at a server, then each media file fragment is transmitted in a media stream form through the HTTP protocol, and the chip rate may be changed in a media play process according to network bandwidth resources, for enabling a user to view a smooth video. The network will retain certain bandwidth resources for downloading the media file. In the case of sufficient bandwidth resources, the user will select uniform resource locators (Uniform Resource Locators, URLs) of high-chip-rate fragments in media presentation description (Media Presentation Description, MPD) to request the server, so that the server may provide high-chip-rate video experience for the user; in the case of insufficient bandwidth resources, the user will select URLs of low-chip-rate fragments in the MPD to request the server, so that the server may provide low-chip-rate video experience to the user, thus ensuring the smoothness of real-time experience of the user.

The Progressive Download mode refers to that the user obtains the media file from the server through the HTTP protocol, and part of the media file may be played while the rest of the media file is downloaded after a short start cache time. In this mode, the terminal may select a high-definition media file to request the server based on the maximum rate allowed by itself and the network, and the chip rate of the requested file is constant. Therefore, the user may be provided with a high-quality video content.

After the MPD is expanded, the URL address information downloaded in the Progressive Download mode is added in the MPD content information.

However, when the Adaptive Streaming mode is adopted to download the media file, the content of the downloaded media file will be adjusted according to the conditions of the network resources, if the network resources are insufficient, then the video quality will be reduced, moreover, the Adaptive Streaming mode consistently occupies certain bandwidth resources, when the user hopes to download a video with higher quality for viewing, for operators, this scenario is a waste of the bandwidth resources; when the Progressive Download mode is adopted to download the media file, since no certain bandwidth resource is consistently occupied, in the case of insufficient network resources, the video content is interrupted to fail to provide a smooth media resource.

SUMMARY OF THE INVENTION

Embodiments of the present invention provide a data transmission method and apparatus through which different quality of service parameters may be flexibly adopted to transmit data in a data transmission process, to adopt different download modes to download a media file in the data transmission process, such that the video quality is improved, and the network bandwidth resources are saved, or the media content may be smoothly played in real time to improve the user experience.

In a first aspect, the present invention provides a method for data transmission, including:

when transmitting data by using a first radio bearer, receiving, by a user equipment UE, radio resource control connection reconfiguration information sent by a base station;

obtaining, by the UE, a second radio bearer according to the radio resource control connection reconfiguration information, wherein a quality of service parameter of the second radio bearer is different from a quality of service parameter of the first radio bearer;

sending, by the UE, radio resource control connection reconfiguration completion information to the base station; and transmitting, by the UE, a part of the data which has not been transmitted by using the second radio bearer.

In a first possible implementation manner, in combination with the first aspect, the radio resource control connection reconfiguration information includes information of establishing the second radio bearer, the information of establishing the second radio bearer includes the quality of service parameter of the second radio bearer, and the obtaining, by the UE, a second radio bearer, includes:

establishing and activating, by the UE, the second radio bearer according to the quality of service parameter of the second radio bearer.

In a second possible implementation manner, in combination with the first aspect, the radio resource control connection reconfiguration information includes information of modifying the first radio bearer, the information of modifying the first radio bearer includes the quality of service parameter of the second radio bearer, and the obtaining, by the UE, a second radio bearer, includes:

modifying, by the UE, the quality of service parameter of the first radio bearer according to the quality of service parameter of the second radio bearer, wherein the second radio bearer is the modified first radio bearer.

In a third possible implementation manner, in combination with the first aspect, or in combination with the first possible implementation manner in the first aspect, or in combination with the second possible implementation manner in the first aspect, the quality of service parameter of the first radio bearer supports a first transmission mode, and the quality of service parameter of the second radio bearer supports a second transmission mode.

In a fourth possible implementation manner, in combination with the third possible implementation manner in the first aspect, the first transmission mode is an adaptive streaming mode, and the second transmission mode is a progressive download mode; or, the first transmission mode is a progressive download mode, and the second transmission mode is an adaptive streaming mode.

In a fifth possible implementation manner, in combination with the fourth possible implementation manner in the first aspect, the adaptive streaming mode is the download mode of a guaranteed bit rate bearer; or the progressive download mode is the download mode of a non-guaranteed bit rate bearer.

In a sixth possible implementation manner, in combination with the fifth possible implementation manner in the first aspect, before the UE receives the radio resource control connection reconfiguration information, the method further includes:

receiving, by the UE, a switch indication, wherein the switch indication is used for indicating the UE to transmit the part of the data which has not been transmitted by using the second transmission mode; and sending, by the UE, a mode switch request message to an application server, wherein the mode switch request message is used for requesting a network side to transmit the part of the data which has not been transmitted by using the second transmission mode.

In a seventh possible implementation manner, in combination with the second possible implementation manner in the first aspect, or in combination with the sixth possible implementation manner in the first aspect, the mode switch request message includes the quality of service parameter of the second radio bearer, and the method further includes:

constructing, by the UE, the quality of service parameter of the second radio bearer according to different media quality types of the second transmission mode selected by the user.

In an eighth possible implementation manner, in combination with the seventh possible implementation manner in the first aspect, the method further includes:

receiving, by the UE, a mode switch response message sent by an application function AF, wherein the mode switch response message is used for indicating mode switch completion.

In a ninth possible implementation manner, in combination with the sixth possible implementation manner in the first aspect, or in combination with the seventh possible implementation manner in the first aspect, or in combination with the eighth possible implementation manner in the first aspect, the method further includes:

providing, by the UE, a switch response to the switch indication, wherein the switch response is used for indicating mode switch completion.

In a tenth possible implementation manner, in combination with any above possible implementation manner in the first aspect, the quality of service parameter of the second radio bearer is different from the quality of service parameter of the first radio bearer, including:

the bearer type of the second radio bearer is different from the bearer type of the first radio bearer.

In a second aspect, the present invention provides a method for data transmission, including:

when a user equipment UE transmits data by using a first transmission mode, obtaining, by an application function AF, a mode switch request message sent by the UE, wherein the mode switch request message is used for requesting a network side to transmit a part of the data which has not been transmitted by using a second transmission mode;

determining, by the AF, a quality of service parameter of a bearer supporting the second transmission mode according to the mode switch request message, wherein the quality of service parameter of the bearer supporting the second transmission mode is different from the quality of service parameter of a first core network bearer supporting the first transmission mode; and sending, by the AF, session information to a policy and charging rules function PCRF, wherein the session information includes the quality of service parameter of the bearer supporting the second transmission mode and an indication of changing a core network bearer used for transmitting the part of the data which has not been transmitted from the first core network bearer into the bearer supporting the second transmission mode.

In a first possible implementation manner, in combination with the second aspect, the indication of changing the core network bearer used for transmitting the part of the data which has not been transmitted from the first core network bearer into the bearer supporting the second transmission mode, includes:

an indication of modifying the quality of service parameter of the first core network bearer into the quality of service parameter of the bearer supporting the second transmission mode, wherein the modified first core network bearer is used for transmitting the part of the data which has not been transmitted by using a second radio bearer.

In a second possible implementation manner, in combination with the second aspect, the indication of changing the core network bearer used for transmitting the part of the data which has not been transmitted from the first core network bearer into the bearer supporting the second transmission mode, includes:

an indication of establishing a second core network bearer by using the quality of service parameter of the bearer supporting the second transmission mode, wherein the second core network bearer is used for transmitting the part of the data which has not been transmitted by using the second radio bearer.

In a third possible implementation manner, in combination with the second aspect, or in combination with the first possible implementation manner in the second aspect, or in combination with the second possible implementation manner in the second aspect, the method further includes:

receiving, by the AF, a session information response message from the PCRF, wherein the session information response message is used for indicating that the core network bearer used for transmitting the part of the data which has not been transmitted has been changed from the first core network bearer into the bearer supporting the second transmission mode; and sending, by the AF, a mode switch response message to the UE, wherein the mode switch response message is used for indicating mode switch completion.

In a fourth possible implementation manner, in combination with any above implementation manner in the second aspect, the first transmission mode is an adaptive streaming mode, and the second transmission mode is a progressive download mode; or, the first transmission mode is a progressive download mode, and the second transmission mode is an adaptive streaming mode.

In a fifth possible implementation manner, in combination with the fourth possible implementation manner in the second aspect, the adaptive streaming mode is the download mode of a guaranteed bit rate bearer; or the progressive download mode is the download mode of a non-guaranteed bit rate bearer.

In a third aspect, the present invention provides an apparatus for data transmission, including:

a resource message receiving module, configured to receive radio resource control connection reconfiguration information sent by a base station when transmitting data by using a first radio bearer;

a bearer obtaining module, configured to obtain a second radio bearer according to the radio resource control connection reconfiguration information, wherein a quality of service parameter of the second radio bearer is different from a quality of service parameter of the first radio bearer;

a resource message sending module, configured to send radio resource control connection reconfiguration completion information to the base station; and a data transmission module, further configured to transmit a part of the data which has not been transmitted by using the second radio bearer.

In a first possible implementation manner, in combination with the third aspect, the radio resource control connection reconfiguration information includes information of establishing the second radio bearer, and the information of establishing the second radio bearer includes a quality of service parameter of the second radio bearer;

the bearer obtaining module is configured to establish and activate the second radio bearer according to the quality of service parameter of the second radio bearer.

In a second possible implementation manner, in combination with the third aspect, the radio resource control connection reconfiguration information includes information of modifying the first radio bearer, and the information of modifying the first radio bearer includes the quality of service parameter of the second radio bearer; and the bearer obtaining module is configured to modify the quality of service parameter of the first radio bearer according to the quality of service parameter of the second radio bearer, wherein the second radio bearer is the modified first radio bearer.

In a third possible implementation manner, in combination with the third aspect, or in combination with the first possible implementation manner in the third aspect, or in combination with the second possible implementation manner in the third aspect, the quality of service parameter of the first radio bearer supports a first transmission mode, and the quality of service parameter of the second radio bearer supports a second transmission mode.

In a fourth possible implementation manner, in combination with the third possible implementation manner in the third aspect, the first transmission mode is an adaptive streaming mode, and the second transmission mode is a progressive download mode; or, the first transmission mode is a progressive download mode, and the second transmission mode is an adaptive streaming mode.

In a fifth possible implementation manner, in combination with the fourth possible implementation manner in the third aspect, the adaptive streaming mode is the download mode of a guaranteed bit rate bearer; or the progressive download mode is the download mode of a non-guaranteed bit rate bearer.

In a sixth possible implementation manner, in combination with the fifth possible implementation manner in the third aspect, a switch indication receiving module is configured to receive a switch indication, wherein the switch indication is used for indicating the apparatus to transmit the part of the data which has not been transmitted by using the second transmission mode; and a switch message sending module, configured to send a mode switch request message to an application server, wherein the mode switch request message is used for requesting a network side to transmit the part of the data which has not been transmitted by using the second transmission mode.

In a seventh possible implementation manner, in combination with the sixth possible implementation manner in the third aspect, the mode switch request message includes the quality of service parameter of the second radio bearer, and the apparatus further includes:

a constructing module, configured to construct the quality of service parameter of the second radio bearer according to different media quality types of the second transmission mode selected by the user.

In an eighth possible implementation manner, in combination with the seventh possible implementation manner in the third aspect, the apparatus further includes:

a switch message receiving module, configured to receive a mode switch response message sent by an application function AF, wherein the mode switch response message is used for indicating mode switch completion.

In a ninth possible implementation manner, in combination with the sixth possible implementation manner in the third aspect, or in combination with the seventh possible implementation manner in the third aspect, or in combination with the eighth possible implementation manner in the third aspect, the apparatus further includes: a switch response module, configured to provide a switch response to the switch indication, wherein the switch response is used for indicating mode switch completion.

In a tenth possible implementation manner, in combination with any above possible implementation manner in the third aspect, the quality of service parameter of the second radio bearer is different from the quality of service parameter of the first radio bearer, including:

the bearer type of the second radio bearer is different from the bearer type of the first radio bearer.

In a fourth aspect, the present invention provides an apparatus for data transmission, including:

an obtaining module, configured to obtain a mode switch request message sent by the UE when a user equipment UE transmits data by using a first radio bearer and a first transmission mode, wherein the mode switch request message is used for requesting a network side to transmit a part of the data which has not been transmitted by using a second transmission mode;

a determining module, configured to determine a quality of service parameter of a bearer supporting the second transmission mode according to the mode switch request message, wherein the quality of service parameter of the bearer supporting the second transmission mode is different from the quality of service parameter of a first core network bearer supporting the first transmission mode; and a session information sending module, configured to send session information to a policy and charging rules function PCRF, wherein the session information includes the quality of service parameter of the bearer supporting the second transmission mode and an indication of changing a core network bearer used for transmitting the part of the data which has not been transmitted from the first core network bearer into the bearer supporting the second transmission mode.

In a first possible implementation manner, in combination with the fourth aspect, the indication of changing the core network bearer used for transmitting the part of the data which has not been transmitted from the first core network bearer into the bearer supporting the second transmission mode, includes:

an indication of modifying the quality of service parameter of the first core network bearer into the quality of service parameter of the bearer supporting the second transmission mode, wherein the modified first core network bearer is used for transmitting the part of the data which has not been transmitted by using a second radio bearer.

In a second possible implementation manner, in combination with the fourth aspect, the indication of changing the core network bearer used for transmitting the part of the data which has not been transmitted from the first core network bearer into the bearer supporting the second transmission mode, includes:

an indication of establishing a second core network bearer by using the quality of service parameter of the bearer supporting the second transmission mode, wherein the second core network bearer is used for transmitting the part of the data which has not been transmitted by using the second radio bearer.

In a third possible implementation manner, in combination with the fourth aspect, or in combination with the first possible implementation manner in the fourth aspect, or in combination with the second possible implementation manner in the fourth aspect, the apparatus further includes:

a session response receiving module, configured to receive a session information response message from the PCRF, wherein the session information response message is used for indicating that the core network bearer used for transmitting the part of the data which has not been transmitted has been changed from the first core network bearer into the bearer supporting the second transmission mode; and a switch response sending module, configured to send a mode switch response message to the UE, wherein the mode switch response message is used for indicating mode switch completion.

In a fourth possible implementation manner, in combination with any above implementation manner in the fourth aspect, the first transmission mode is an adaptive streaming mode, and the second transmission mode is a progressive download mode; or, the first transmission mode is a progressive download mode, and the second transmission mode is an adaptive streaming mode.

In a fifth possible implementation manner, in combination with the fourth possible implementation manner in the fourth aspect, the adaptive streaming mode is the download mode of a guaranteed bit rate bearer; or the progressive download mode is the download mode of a non-guaranteed bit rate bearer.

According to the data transmission method and apparatus provided by the embodiments of the present invention, when transmitting data by using the first radio bearer, the user equipment UE receives the radio resource control connection reconfiguration information sent by the base station; the UE obtains the second radio bearer according to the radio resource control connection reconfiguration information, wherein the quality of service parameter of the second radio bearer is different from the quality of service parameter of the first radio bearer; the UE sends the radio resource control connection reconfiguration completion information to the base station; the UE transmits the part of the data which has not been transmitted by using the second radio bearer. Compared with the condition in the prior art that, when the Adaptive Streaming mode is adopted to download the media file, the content of the downloaded media file will be adjusted according to the conditions of the network resources, if the network resources are insufficient, the video quality will be reduced, moreover, the Adaptive Streaming mode consistently occupies certain bandwidth resources, when the user hopes to download a video with higher quality for viewing, for operators, this scenario is a waste of the bandwidth resources; when the Progressive Download mode is adopted to download the media file, since no certain bandwidth resource is consistently occupied, in the case of insufficient network resources, the video content is interrupted to fail to provide a smooth media resource, by adopting the solutions provided in the embodiments of the present inventions, different quality of service parameters may be flexibly adopted to transmit data in a data transmission process, to flexibly adopt different download modes to download the media file in the data transmission process, such that the video quality may be improved and the network bandwidth resources are saved, or the media content may be smoothly played in real time to improve the user experience.

BRIEF DESCRIPTION OF THE DRAWINGS

To illustrate technical solutions in the embodiments of the present invention or in the prior art clearer, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF THE EMBODIMENTS

A clear and complete description of technical solutions in the embodiments of the present invention will be given below in combination with the accompanying drawings in the embodiments of the present invention. Apparently, the embodiments described are merely a part, but not all, of the embodiments of the present invention. All of other embodiments, obtained by those of ordinary skill in the art based on the embodiments of the present invention without any creative effort, fall into the protection scope of the present invention.

Embodiment 1

Figure 1:
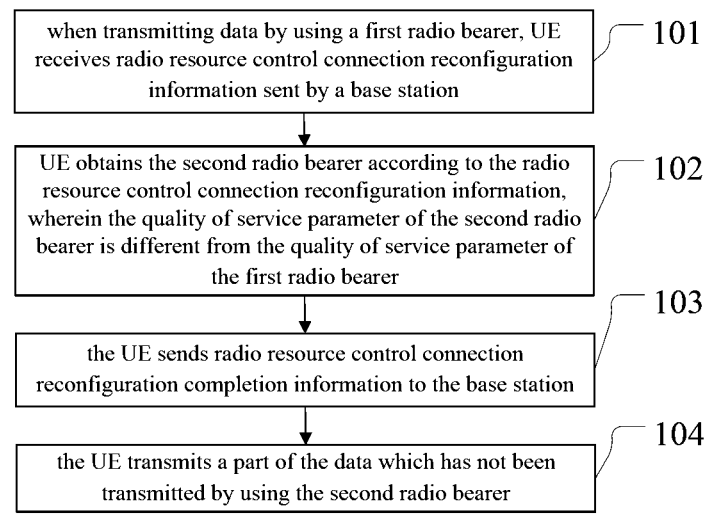
FIG. 1 is a flow chart of a method for data transmission provided by embodiment 1 of the present invention.

The embodiment of the present invention provides a method for data transmission, as shown in FIG. 1, including:

step 101, when transmitting data by using a first radio bearer, a user equipment (User Equipment, UE) receives radio resource control connection reconfiguration information sent by a base station.

In this embodiment, the transmitting data by using the first radio bearer may include: transmitting the data by using the first radio bearer with a first transmission mode, wherein the first transmission mode may be an adaptive streaming mode, or the first transmission mode may be a progressive download mode. The adaptive streaming mode is the download mode of a guaranteed bit rate (Guaranteed Bit Rate, GBR) bearer; the progressive download mode is the download mode of a non-guaranteed bit rate (non-Guaranteed Bit Rate, non-GBR) bearer.

In this embodiment, the radio resource control connection reconfiguration information includes information of establishing a second radio bearer, wherein the information of establishing the second radio bearer includes a quality of service (Quality of Service, QoS) parameter supporting the second radio bearer. Or, the radio resource control connection reconfiguration information includes information of modifying the first radio bearer, and the information of modifying the first radio bearer includes a quality of service parameter supporting the second radio bearer.

Step 102, the UE obtains the second radio bearer according to the radio resource control connection reconfiguration information, wherein the quality of service parameter of the second radio bearer is different from the quality of service parameter of the first radio bearer.

Optionally, the UE establishes and activates the second radio bearer according to the quality of service parameter supporting the second radio bearer included in the radio resource control connection reconfiguration information; or, the UE modifies the quality of service parameter of the first radio bearer according to the quality of service parameter supporting the second radio bearer included in the radio resource control connection reconfiguration information, wherein the second radio bearer is the modified first radio bearer.

In this embodiment or other embodiments of the present invention, the QoS parameter includes a QoS class identifier (QoS Class Identifier, QCI) and allocation retention priority (Allocation Retention Priority, ARP), wherein the QCI includes four parameters: resource type Resource Type, priority priority, packet delay budget Packet Delay Budget and packet error loss rate Packet Error Loss Rate.

The Resource Type is used for determining whether to permanently allocate a network resource to a service or to require to ensure a fixed bandwidth bearer. The value of the Resource Type may be GBR or non-GBR, if the value is the GRB, the network will permanently allocate a lowest bandwidth resource to this bearer, even if the network resources are insufficient, it is ensured that the bandwidth resource is allocated to the bearer, if the value is the non-GBR, the network will not permanently allocate the bandwidth resource to this bearer, and the allocated bandwidth resource will vary with the condition of the network resources.

The Priority is used for distinguishing different service data function (Service Data Function, SDF) aggregation priorities of the same UE and is also used for distinguishing the SDF aggregation priorities between different UE.

The Packet Delay Budget is used for expressing the time delay upper limit in the duration after a data packet is sent from the UE until a policy and charging enforcement function (Policy and Charging Enforcement Function, PCEF) is triggered, wherein the PCEF is a functional entity on a P-GW.

The Packet Error Loss Rate is used for expressing the upper limit of the packet error loss rate under a non-congestion condition of the network.

The service of quality parameter of the first radio bearer supports the first transmission mode, and the service of quality parameter of the second radio bearer supports the second transmission mode.

Step 103, the UE sends radio resource control connection reconfiguration completion information to the base station.

After the UE obtains the second radio bearer, it indicates that the radio resource control connection reconfiguration has been completed.

Step 104, the UE transmits a part of the data which has not been transmitted by using the second radio bearer.

The embodiment of the present invention provides a method for data transmission, when transmitting data by using the first radio bearer, the second radio bearer is obtained according to the radio resource control connection reconfiguration information, and the second radio bearer is used for transmitting the part of the data which has not been transmitted, so that radio bearers with different quality of service parameters are flexibly adopted to transmit data under the condition of not interrupting the service. When the radio bearers with different quality of service parameters support different download modes, the different download modes may be adopted to download a media file under the condition of not interrupting the service, such that the video quality may be improved and the network bandwidth resources are saved, or the media content may be smoothly played in real time to improve the user experience.

Figure 2:
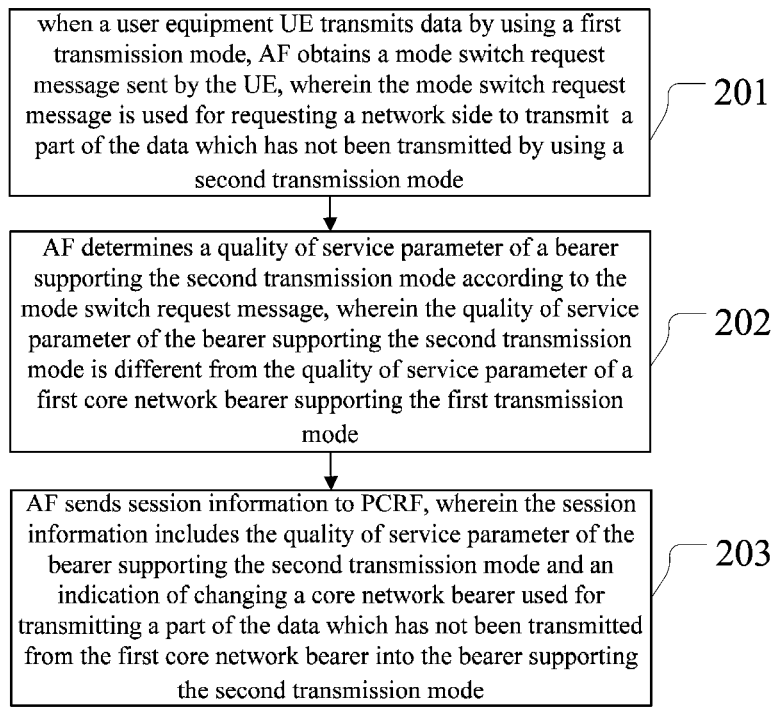
FIG. 2 is a flow chart of another method for data transmission provided by embodiment 1 of the present invention.

The embodiment of the present invention provides another method for data transmission as shown in FIG. 2, including:

step 201, when a user equipment UE transmits data by using a first transmission mode, an application function (Application Function, AF) obtains a mode switch request message sent by the UE, wherein the mode switch request message is used for requesting a network side to transmit a part of the data which has not been transmitted by using a second transmission mode.

In this embodiment, the UE transmits data by using the first transmission mode, for example, the UE transmits data by using a first radio bearer and the first transmission mode.

In this embodiment, the UE sends the mode switch request message to an application server, and the AF intercepts the mode switch request message sent by the UE and performs further processing according to the mode switch request message.

In this embodiment, the first transmission mode may be an adaptive streaming mode, and the second transmission mode may be a progressive download mode; or the first transmission mode may be the progressive download mode, and the second transmission mode may be the adaptive streaming mode. The adaptive streaming mode is the download mode of a guaranteed bit rate bearer GBR bearer; the progressive download mode is the download mode of a non-guaranteed bit rate bearer non-GBR bearer.

Step 202, the AF determines a quality of service parameter of a bearer supporting the second transmission mode according to the mode switch request message, wherein the quality of service parameter of the bearer supporting the second transmission mode is different from the quality of service parameter of a first core network bearer supporting the first transmission mode.

Step 203, the AF sends session information to a policy and charging rules function (Policy and Charging Rules Function, PCRF), wherein the session information includes the quality of service parameter of the bearer supporting the second transmission mode and an indication of changing a core network bearer used for transmitting the part of the data which has not been transmitted from the first core network bearer into the bearer supporting the second transmission mode.

In this embodiment, the indication of changing the core network bearer used for transmitting the part of the data which has not been transmitted from the first core network bearer into the bearer supporting the second transmission mode includes: an indication of modifying the quality of service parameter of the first core network bearer into the quality of service parameter of the bearer supporting the second transmission mode, wherein the modified first core network bearer is used for transmitting the part of the data which has not been transmitted by using a second radio bearer; or, the indication of changing the core network bearer used for transmitting the part of the data which has not been transmitted from the first core network bearer into the bearer supporting the second transmission mode includes: an indication of establishing a second core network bearer by using the quality of service parameter of the bearer supporting the second transmission mode, wherein the second core network bearer is used for transmitting the part of the data which has not been transmitted by using the second radio bearer.

Further optionally, the AF receives a session information response message from the PCRF, wherein the session information response message is used for indicating that the core network bearer used for transmitting the part of the data which has not been transmitted has been changed from the first core network bearer into the bearer supporting the second transmission mode; the AF sends a mode switch response message to the UE, wherein the mode switch response message is used for indicating mode switch completion.

The embodiment of the present invention provides a method for data transmission, the AF determines the quality of service parameter of the bearer supporting the second transmission mode according to the obtained mode switch request message and sends the quality of service parameter of the bearer supporting the second transmission mode to the PCRF through the session information, so as to change the core network bearer used for transmitting the part of the data which has not been transmitted from the first core network bearer into the bearer supporting the second transmission mode. By adopting the embodiment of the present invention, different quality of service parameters may be flexibly adopted to transmit data in a data transmission process, in order to flexibly adopt different download modes to download a media file in the data transmission process, such that the video quality may be improved and the network bandwidth resources are saved, or the media content may be smoothly played in real time to improve the user experience.

Embodiment 2

The embodiment of the present invention provides a method for data transmission, specifically, an adaptive streaming Adaptive Streaming mode is switched to a progressive download Progressive Download mode, wherein in this embodiment, the Adaptive Streaming mode is switched to the Progressive Download mode by newly establishing a non-GBR bearer of the Progressive Download mode.

Figure 3:
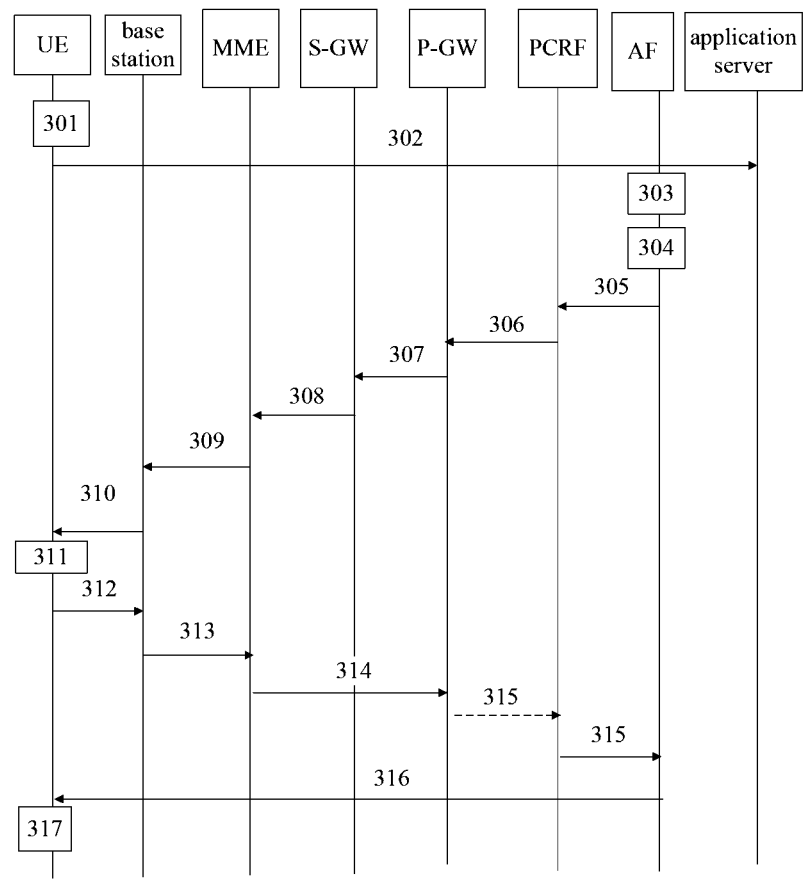
FIG. 3 is a flow chart of a method for data transmission provided by embodiment 2 of the present invention.

As shown in FIG. 3, the method includes:

step 301, when transmitting data by using a first radio bearer, a user equipment UE receives a switch indication.

In this embodiment, the transmitting data by using the first radio bearer may include: for example, transmitting the data by using the first radio bearer and a first transmission mode. The first transmission mode is an adaptive streaming Adaptive Streaming mode, and the adaptive streaming mode is the download mode of a guaranteed bit rate GBR bearer.

In this embodiment, the switch indication may be an indication sent by a user by operation on the UE, and the switch indication is used for indicating the UE to transmit a part of the data which has not been transmitted by using the second transmission mode. For example, the user inputs a command of switching the download mode through an application program interface. The second transmission mode is a progressive download Progressive Download mode, and the progressive download mode is the download mode of a non-guaranteed bit rate non-GBR bearer. Specifically, in this embodiment, the switch instruction is an instruction of newly establishing the non-GBR bearer.

In a system architecture evolution (System Architecture Evolution, SAE)/evolved packet core (Evolved Packet Core, EPC) network architecture, the network will establish a corresponding bearer bearer to transmit services according to different download modes, and the bearer may be divided into a GBR bearer and a non-GBR bearer according to the types of the borne services. The GBR bearer may ensure a certain lowest bandwidth resource, and the lowest bandwidth resource will be retained no matter it is used or not, such that real-time play smoothness may be ensured when the Adaptive Streaming mode is adopted. The non-GBR bearer does not retain a bandwidth resource in advance, so that the UE may select a high-definition media file to request an application server according to the willing of the user and the allowable maximum rate of the network, without considering the real-time state of the network.

In this embodiment, when transmitting the data by using the first transmission mode, namely, the Adaptive Streaming mode, the user is viewing a video content in real time, and a GBR Bearer allocated by a core network is used as a first core network bearer to bear services, in order to achieve the first transmission mode. The first core network bearer corresponds to the first radio bearer and supports the first transmission mode together with the same. At this time, the user hopes to view a higher-definition video content and sends a switch instruction to the UE by selecting an operating button of the UE, in order to request a network side to transmit the part of the data which has not been transmitted by using the selected Progressive Download mode. For example, the user touches "high-definition video" in a display screen of the UE to select the transmission mode, namely, the Progressive Download mode in this embodiment.

Step 302, the UE sends a mode switch request message to an application server.

The UE sends the mode switch request message to the application server according to the switch instruction, wherein the mode switch request message is used for requesting the network side to transmit the part of the data which has not been transmitted by using the selected Progressive Download mode.

It should be noted that, the mode switch request message includes a mode switch indication, the chip rate of a video fragment and the storage address of the video fragment. The video fragment herein refers to a fragment of a media file downloaded by the UE.

When the user sends a mode switch request to the application server through the UE, the background of the UE will firstly obtain the chip rate of the video fragment and the storage address of the video fragment from a downloaded media presentation description (Media Presentation Description, MPD) file, and then send the mode switch request to the application server. It should be noted that, the MPD is a file for describing media presentation, the entire media content to be downloaded will be divided into a plurality of content fragments with the same duration, each content fragment corresponds to several different chip rates, the chip rate of each content fragment expresses the quality and definition of the media content, the MPD includes the storage addresses of a plurality of fragments with different chip rates, and these fragments with different chip rates may be randomly combined to form an entire content. After being expanded, the MPD includes the chip rate of the video fragment and the storage address of the video fragment necessary for downloading in the second transmission mode.

Step 303, the AF obtains the mode switch request message sent by the UE.

The AF intercepts the mode switch request message sent by the UE to the application server and obtains the mode switch indication, the chip rate of the video fragment and the storage address of the video fragment included in the mode switch request message.

Step 304, the AF determines a quality of service QoS parameter of a bearer supporting the second transmission mode according to the mode switch request message, wherein the quality of service QoS parameter of the bearer supporting the second transmission mode is different from the QoS parameter of a first core network bearer supporting the first transmission mode.

The AF determines the quality of service parameter of a bearer supporting the Progressive Download mode according to the mode switch indication and the chip rate of the video fragment included in the mode switch request message.

Step 305, the AF sends session information to a policy and charging rules function PCRF, wherein the session information includes the QoS parameter of the bearer supporting the second transmission mode and an indication of changing a core network bearer used for transmitting the part of the data which has not been transmitted from the first core network bearer into the bearer supporting the second transmission mode.

In this embodiment, the indication of changing the core network bearer used for transmitting the part of the data which has not been transmitted from the first core network bearer into the bearer supporting the Progressive Download mode included in the session information is specifically an indication of establishing a second core network bearer by using the QoS parameter of the bearer supporting the Progressive Download mode, and the second core network bearer is used for transmitting the part of the data which has not been transmitted.

Step 306, the PCRF the session information sent by the AF, constructs a new policy control and charging (Policy Control and Charging, PCC) policy according to the session information, and sends the new PCC policy to a P-GW.

The PCRF may construct a new PCC policy according to the QoS parameter of the bearer supporting the Progressive Download mode in the session information and the indication of establishing the second core network bearer by using the QoS parameter of the bearer supporting the Progressive Download mode, wherein the new PCC policy includes: the QoS parameter of the bearer supporting the Progressive Download mode, a new charging parameter determined according to the QoS parameter of the bearer supporting the Progressive Download mode, and the like.

It should be noted that, in this embodiment, subsequent operation is performed mainly on the change of a Resource Type parameter in QoS. In this embodiment, the value of the Resource Type parameter is non-GBR, namely, a new bearer is newly established, and a fixed resource does not need to be retained.

Step 307, after receiving the new PCC policy sent by the PCRF, the P-GW implements the new policy through the PCEF in the P-GW, namely, initiates a request of newly establishing a non-GBR bearer to an S-GW.

The non-GBR bearer is a type of an EPS bearer and may support the Progressive Download mode. In this embodiment, the newly established second core network bearer is the non-GBR bearer. The main functions of the P-GW in the EPC architecture are as follows: an interface gateway of LTE and an external network, packeting filter based on the user and data packet marking of uplink and downlink transmission layers, and the like.

The request of newly establishing the non-GBR bearer includes the QoS parameter of the bearer supporting the Progressive Download mode.

Step 308, the S-GW forwards the received request of newly establishing the non-GBR bearer to an MME.

In this, the main function of the S-GW in the EPC architecture includes: data packet routing and forwarding, data packet marking of upper and lower transmission layers, and the like.

Step 309, the sends the request of newly establishing the non-GBR bearer to a base station.

The MME is a key control node of a 3GPP protocol LTE access network, and is involved with a bearer activating or closing process. In addition, the MME also sends a session management to the base station, and the session management request is automatically generated according to the received request sent by the S-GW.

Step 310, the base station maps the QoS parameter of the bearer supporting the second transmission mode into the QoS parameter of a second radio bearer and sends radio resource control connection reconfiguration information to the UE.

The base station maps the QoS parameter of the second core network bearer into the QoS parameter of the second radio bearer, wherein the QoS parameter of the second core network bearer is the QoS parameter of the bearer supporting the Progressive Download mode and is used for identifying the service guarantee correspondingly obtained by the bearer. The QoS parameter of the second radio bearer is bearer service guarantee to be satisfied by radio waves transmitted over the air, for example, delay of delayed transmission, error rate and the like. The QoS parameter of the bearer supporting the Progressive Download mode is mapped into the QoS parameter of the second radio bearer, namely, the QoS parameter of the bearer supporting the Progressive Download mode is transmitted to the QoS parameter of the second radio bearer, and EPS is the same as a radio network bearer in the QoS value.

Since the second radio bearer obtains a new QoS parameter, at this time, the base station needs to reallocate a radio resource according to the QoS parameter of the second radio, for example, reallocating a new bandwidth value, new sending power and the like. Therefore, the base station sends the radio resource control connection reconfiguration information to the UE, the radio resource control connection reconfiguration information includes information of establishing the second radio bearer, wherein the information of establishing the second radio bearer includes a quality of service parameter supporting the second radio bearer.

Step 311, the UE obtains the second radio bearer according to the radio resource control connection information, wherein the QoS parameter of the second radio bearer is different from the QoS parameter of the first radio bearer.

In this embodiment, the UE reestablishes the second radio bearer according to the quality of service parameter the second radio bearer, and activates the established second radio bearer. The QoS parameter of the second radio bearer is different from the QoS parameter of the first radio bearer, including: the bearer type of the second radio bearer is different from the bearer type of the first radio bearer. The QoS parameter of the first radio bearer supports the Adaptive Streaming mode, and the Adaptive Streaming mode is the download mode of the GBR bearer; the QoS parameter of the second radio bearer supports the Progressive Download mode, and the Progressive Download mode is the download mode of the non-GBR bearer.

Step 312, the UE sends radio resource control connection reconfiguration completion to the base station.

Further, a session management response is established at the non-access layer of the UE and then is directly to the base station.

Step 313, after receiving the radio resource control connection reconfiguration completion information sent by the UE, the base station sends a new bearer response message, namely, a establishment response message to the MME; and the base station receives the session management response sent back by the terminal and sends the same to the MME.

The new response message includes a response message of non-GBR bearer establishment.

Step 314, after receiving the new bearer response message and the session management response, the MME sends the new bearer response message to the P-GW through the S-GW.

Step 315, the P-GW sends a session modification success message to the AF according to the new bearer response message, and the PCRF obtains the session modification success message and sends a session information response message to the AF.

The session information response message is used for indicating that the core network bearer used for transmitting the part of the data which has not been transmitted has been changed from the first core network bearer into the bearer supporting the Download mode, namely, the non-GBR bearer is used for transmitting the part of the data which has not been transmitted.

Step 316, after receiving the session information response message, the AF sends a mode switch message to the UE, wherein the mode switch response message is used for indicating mode switch completion.

Step 317, after receiving the mode switch response message sent by the AF, the UE provides a switch to the switch indication, and transmits the part of the data which has not been transmitted by using the second radio bearer.

In this step, the switch response is used for indicating mode switch completion, at this time, the adaptive mode is switched to the progressive download mode to transmit the part of the data which has not been transmitted, namely, service transmission on the UE is achieved on the non-GBR bearer.

The embodiment of present invention provides a method for data transmission, when transmitting data by using the first radio bearer, the second radio bearer is established according to the QoS parameter supporting the second radio bearer, and the second radio bearer is used for transmitting the part of the data which has not been transmitted, so that different quality of service parameters are flexibly adopted to transmit data in the data transmission process, in order to adopt different download modes to download a media file in the data transmission process, as a result, the media content may be smoothly played in real time to improve the user experience.

The embodiment of the present invention provides another method for data transmission, specifically, an adaptive streaming Adaptive Streaming mode is switched to a progressive download Progressive Download mode, wherein in this embodiment, the Adaptive Streaming mode is switched to the Progressive Download mode by modifying the GBR bearer of the current Adaptive Streaming mode into the non-GBR bearer of the Progressive Download mode.

Specific reference may be made to FIG. 3, and the method is described in detail as follows:

step 301, when data by using a first radio bearer, a user equipment UE receives a switch indication.

In this embodiment, the transmitting the data by using the first radio bearer may include: transmitting the data by using the first radio bearer and a first transmission mode. The first transmission mode is an adaptive streaming Adaptive Streaming mode, and the adaptive mode is the download mode of a guaranteed bit rate GBR bearer.

In this embodiment, the switch indication may be an indication sent by a user by operating the UE, and the switch indication is used for indicating the UE to transmit the part of the data which has not been transmitted by using the second transmission mode. For example, the user inputs a command of switching the download mode through an program interface. The second transmission mode is a progressive download Progressive Download mode, and the progressive download mode is the download mode of a non-guaranteed bit rate non-GBR bearer. Specifically, in this embodiment, the switch instruction is an instruction of modifying the GBR bearer.

In this embodiment, when transmitting the data by using the first transmission mode, namely, the Adaptive Streaming mode, the user is viewing a video content in real time, and a GBR Bearer allocated by a core network is used as a first core network bearer to bear services, order to achieve the first transmission mode. The first core network bearer and the first radio bearer are corresponding to each other and both support the first transmission mode. At this time, the user hopes to view a higher-definition video content and sends a switch instruction to the UE by selecting an operating button of the UE, in order to request a network side to transmit the part of the data which has not been transmitted by using the selected Progressive Download mode. For example, the user touches "high-definition video" in a display screen of the UE to select the transmission mode, namely, the Progressive Download mode in this embodiment.

Step 302, the UE sends a mode switch request message to an application server.

The UE sends the mode switch request message to the application server according to the instruction, wherein the mode switch request message is used for requesting the network side to transmit the part of the data which has not been transmitted by using the selected Progressive Download mode.

It should be noted that, the mode switch request message includes a mode switch indication, the rate of a video fragment and the storage address of the video fragment. The video fragment herein refers to a fragment of a media file downloaded by the UE.

When the user sends a mode switch request to the application server through the UE, the background of the UE will firstly obtain the chip rate of the video fragment and the storage address of the video fragment from a downloaded media presentation description (Media Presentation Description, MPD) file, and then send the mode switch request to the server. It should be noted that, the MPD is a file for describing media presentation, the entire media content to be downloaded will be divided into a plurality of content fragments with the same duration, each content fragment corresponds to several different chip rates, the chip rate of each content fragment expresses the quality and definition of the media content, the MPD includes the storage addresses of a plurality of fragments with different chip rates, and these fragments with different chip rates may be randomly combined to form an entire content. After being expanded, the MPD includes the chip rate of the video fragment and the storage address of the video fragment necessary for downloading in the second transmission mode.

Optionally, before the mode switch request message to the application server, the UE may also construct a quality of service QoS parameter supporting the second radio bearer through the background of the UE according to different media quality types of the second transmission mode selected by the user. A QCI value included in the quality of service QoS parameter of the bearer supporting the second transmission mode includes four parameters: resource type Resource Type, priority priority, packet delay budget Packet Delay Budget and packet error loss rate Packet Error Loss Rate. In this embodiment, the value of the Resource Type is non-GBR, and afterwards, the QoS value of the current GBR bearer is modified into the quality of service QoS parameter of the bearer supporting the second transmission mode.

After the background of the UE constructs the QoS parameter supporting the second radio bearer, the UE sends the mode switch request message to the application server, wherein the mode switch request message includes information of modifying the first radio bearer, and the information of modifying the first radio bearer includes the quality of service parameter supporting the second radio bearer.

Step 303, the AF the mode switch request message sent by the UE.

Optionally, in this step, the AF obtains the mode switch request message sent by the UE to the application server, wherein the mode switch request message includes a mode switch, the chip rate of a video fragment and the storage address of the video fragment;

optionally, in this step, the AF obtains the mode switch request message sent by the UE to the application, wherein the mode switch request message includes the mode switch indication, the chip rate of the video fragment, the storage address of the video fragment and the QoS parameter supporting the second radio bearer.

Step 304, the AF determines a quality of service QoS parameter of a bearer supporting the second mode according to the mode switch request message, wherein the quality of service QoS parameter of the bearer supporting the second transmission mode is different from the QoS parameter of a first core network bearer supporting the first transmission mode.

Optionally, when the mode switch request message intercepted by the AF and sent by the UE includes the mode switch indication, the chip rate of the video fragment and the storage address of the video fragment, the AF determines the QoS parameter of a bearer supporting the Progressive Download mode according to the mode switch indication and the chip rate of the video fragment included in the mode switch request message.

Optionally, the AF obtains the mode switch request message sent by the UE to the application server, wherein when the mode switch request message includes the mode switch indication, the chip rate of the video fragment, the storage address of the video fragment and the QoS parameter supporting the second radio bearer, the AF has obtained the QoS parameter of the bearer supporting the Progressive Download mode and does not need to reconstruct the QoS parameter of the bearer supporting the Progressive Download mode.

Step 305, the AF sends session information to a policy and charging rules function PCRF, the session information includes the QoS parameter of the bearer supporting the second transmission mode and an indication of changing a core network bearer used for transmitting the part of the data which has not been transmitted from the first core network bearer into the bearer supporting the second transmission mode.

It should be noted that, the QoS parameter of the bearer supporting the Progressive Download mode may be the QoS parameter of a new bearer supporting the Progressive Download mode and constructed by the UE, and may also be the QoS parameter of a new bearer supporting the Progressive Download mode and constructed by the AF.

In this embodiment, the indication of changing the core network bearer used for transmitting the part of the data which has not been transmitted from the first core network bearer into the bearer the Progressive Download mode included in the session information is specifically an indication of modifying the quality of service parameter of the first core network bearer into the quality of service parameter of the bearer supporting the Progressive Download mode, wherein the modified first core network bearer is used for transmitting the part of the data which has not been transmitted.

Step 306, the PCRF receives the session information sent by the AF, constructs a new PCC policy to the session information and sends the new PCC policy to the P-GW.

The PCRF may construct a new PCC policy according to the QoS parameter of the constructed bearer supporting the Progressive Download mode in the session information and the indication of modifying the quality of service parameter of the first core network bearer into the quality of service parameter of the bearer supporting the Progressive Download mode, wherein the new PCC policy includes: the QoS parameter of the bearer supporting the Progressive Download mode, a new charging parameter determined according to the QoS parameter of the bearer supporting the Progressive Download mode, and the like.

Step 307, after receiving the new PCC policy sent by the PCRF, the P-GW implements the new PCC policy through the PCEF in the P-GW, namely, initiates a request of modifying a GBR bearer to an S-GW.

The request of modifying the GBR bearer is a request of modifying the first core network bearer.

In this embodiment, the main functions of the P-GW in the EPC architecture are as follows: an interface gateway of LTE and an external network, packet filtering based on the user and data packet marking of uplink and downlink transmission layers, and the like.

The request of modifying the GBR bearer includes the QoS parameter of the bearer supporting the Progressive Download mode.

Step 308, the S-GW forwards the received request of modifying the GBR bearer to an MME.

In this embodiment, main function of the S-GW in the EPC architecture includes: data packet routing and forwarding, data packet marking of upper and lower transmission layers, and the like.

Step 309, the MME sends the request of modifying the GBR bearer to a base station.

The MME is a key control node of a 3GPP protocol LTE access network, and is involved with a bearer activating or closing process. In addition, the MME also sends a session management to the base station, and the session management request is automatically generated according to the received request sent by the S-GW.

Step 310, the base maps the QoS parameter of the bearer supporting the second transmission mode into the QoS parameter of a second radio bearer and sends radio resource control connection reconfiguration information to the UE.

The base station modifies the QoS parameter of the bearer supporting the Adaptive Streaming mode, namely, the QoS parameter of the first core network bearer into the QoS parameter of the bearer supporting the Progressive Download mode according to the QoS parameter of the bearer supporting the Progressive Download mode, and maps the modified QoS parameter of the first core network bearer into the QoS parameter of the second radio bearer, wherein the modified QoS parameter of the first core network bearer is the QoS parameter of the bearer supporting the Progressive Download mode and is used for identifying the service guarantee correspondingly obtained by the bearer. The QoS parameter of the second radio bearer is bearer service guarantee to be satisfied by radio waves transmitted over the air, for example, delay of delayed transmission, error rate and the like. The QoS parameter of the bearer supporting the Progressive Download mode is mapped into the QoS parameter of the second radio bearer, namely, the QoS parameter of the bearer supporting the Progressive Download mode is transmitted to the QoS parameter of the second radio bearer, and EPS is the same as a radio network bearer in the QoS value.

Since the second radio bearer obtains a new QoS parameter, at this time, the base station needs to reallocate a radio resource according to the QoS parameter of the second radio bearer, for example, reallocating a new bandwidth value, new sending power and the like. Therefore, the base station sends the radio resource control connection reconfiguration information to the UE, the radio resource control connection reconfiguration information includes information of modifying the first radio bearer, wherein the information of modifying the first radio bearer includes a quality of service parameter supporting the second radio bearer.

Step 311, the UE obtains the second radio bearer according to the radio resource control connection information, wherein the QoS parameter of the second radio bearer is different from the QoS parameter of the first radio bearer.

In this embodiment, the UE modifies the QoS parameter of the first radio bearer according to the QoS parameter supporting the second radio bearer, in order to obtain the second radio bearer, the second radio bearer is the modified first radio bearer. In this embodiment, the QoS parameter of the first radio bearer supports the Adaptive Streaming mode, and the Adaptive Streaming mode is the download mode of the GBR bearer; the QoS parameter of the second radio bearer supports the Progressive Download mode, and the progressive download mode is the download mode of the non-GBR bearer.

Step 312, the UE radio resource control connection reconfiguration completion information to the base station.

After modifying the QoS parameter of the first radio bearer into the QoS parameter of the second radio bearer, the UE sends a QoS parameter modification completion confirmation of the first radio bearer to the base station, and then sends the radio resource control connection reconfiguration completion information to the base station.

Further, a session management response is established at the non-access layer of the terminal and then is sent to the base station.

Step 313, after receiving the radio resource control connection reconfiguration completion information sent by the UE, the base station sends a response message of QoS modification completion of the first radio bearer to the MME; and the base station sends the received session response sent back by the UE to the MME.

Step 314, after receiving the response message of QoS modification completion of the first radio bearer and the session management response, the MME sends the response message of modification completion of the first radio bearer to the P-GW through the S-GW.

Step 315, the P-GW sends a session modification success message to the AF according to the response message of QoS modification completion of the first radio bearer, and the PCRF obtains the session modification success message and sends a session information response message to the AF.

The session information response message is used for indicating that the core network bearer used for the part of the data which has not been transmitted has been changed from the first core network bearer into the bearer supporting the Progressive Download mode, namely, the non-GBR bearer is used for transmitting the part of the data which has not been transmitted.

Step 316, after receiving the session information response message, the AF sends a mode switch response message to the UE, wherein the mode switch response message is used for indicating mode switch completion.

Step 317, after receiving the mode switch response message sent by the AF, the UE provides a switch response to the switch indication, and transmits the part of the data which has not been transmitted by using the second radio bearer.

In this step, the switch response is used for indicating mode switch completion, at this time, the adaptive streaming is switched to the progressive download mode to transmit the part of the data which has not been transmitted, namely, service transmission on the UE is achieved on the non-GBR bearer.

The embodiment of the present invention provides a method for data transmission, when transmitting data by using the first radio bearer, the QoS parameter supporting the first radio bearer is modified according to the QoS parameter supporting the second radio bearer, and the second radio bearer is used for transmitting the part of the data which has not been transmitted, so that different quality of service parameters are flexibly adopted to transmit data in the data transmission process, in order to adopt different download modes to download a media file in the data transmission process, as a result, the media content may be smoothly played in real time to improve the user experience.

The embodiment of the present invention provides a method for data transmission, specifically, a progressive download Progressive Download mode is switched to an adaptive streaming Adaptive Streaming mode, wherein in this embodiment, the Progressive Download mode is switched to the Adaptive Streaming mode by newly establishing a GBR Bearer of the Adaptive Streaming mode.

Specific reference may be to FIG. 3, and the method is described in detail as follows:

step 301, when data by using a first radio bearer, a user equipment UE receives a switch indication.

In this embodiment, the transmitting the data by using the first radio bearer may include: transmitting the data by using the first radio bearer and a first transmission mode. The first transmission is the Progressive Download mode, and the Progressive Download mode is the download mode of a non-GBR bearer.

In this embodiment, the switch indication may be an indication sent by a user by operating the UE, and the indication is used for indicating the UE to transmit the part of the data which has not been transmitted by using the second transmission mode. For example, the user inputs a command of switching the download mode through an application program interface. The second transmission mode is the Adaptive Streaming mode, and the Adaptive Streaming mode is the download mode of the GBR bearer. Specifically, in this embodiment, the switch instruction is an instruction of newly establishing the GBR bearer.

In this embodiment, when transmitting the data by using the first transmission mode, namely, the Progressive Download mode, the user is downloading a video content, and a non-GBR Bearer allocated by a core network is used as a first core network bearer to bear services, in order to achieve the first transmission mode. The first core network bearer corresponds to the first radio bearer and supports the first transmission mode together with the. At this time, the user hopes to view the video content in real time and sends the switch instruction to the UE by selecting an operating button of the UE, in order to request a network side to transmit the part of the data which has not been transmitted by using the selected second transmission mode. For example, the user touches "real-time play" in a display screen of the UE to select the transmission mode, namely, the Adaptive Streaming mode in this embodiment.

When the user sends a mode switch request to an application server through the UE, the background of the UE will download a media presentation description MPD file of the video content, obtain the chip rate of a video fragment and the storage address of the video fragment from the MPD file and then send the mode switch request to the application server. It should be noted that, the MPD is a file for describing media presentation, the entire media content to be downloaded will be divided into a plurality of content fragments with the same duration, each content fragment corresponds to several different chip rates, the chip rate of each content fragment expresses the quality and definition of the media content, the MPD includes the storage addresses of a plurality of fragments with different chip rates, and these fragments with different chip rates may be randomly combined to form an entire content. After being expanded, the MPD includes the chip rate of the video fragment and the storage address of the video fragment necessary for downloading in the second transmission mode.

Step 302, the UE sends a mode switch request message to an application server.

The UE sends the mode switch request message to the application server according to the switch instruction, wherein the mode switch request message is used for requesting the network side to transmit the part of the data which has not been transmitted by using the selected second transmission mode.

It should be noted that, the mode switch request message includes a mode switch indication, the chip rate a video fragment and the storage address of the video fragment. The video fragment herein refers to a fragment of a media file downloaded by the UE.

Step 303, the AF obtains mode switch request message sent by the UE.

The AF intercepts the mode switch request message sent by the UE to the application server and obtains the mode indication, the chip rate of the video fragment and the storage address of the video fragment included in the mode switch request message.

Step 304, the AF determines a quality of service QoS parameter of a bearer supporting the second transmission mode according to the mode switch request message, wherein the quality of service QoS parameter of the bearer supporting the second transmission mode is different from the QoS parameter of a first core network bearer supporting the first transmission mode.

The AF determines the quality of service parameter of a bearer supporting the Adaptive Streaming mode according to the mode switch indication and the chip rate of the video fragment included in the mode switch request message.

Step 305, the AF sends session information to a policy and charging rules function PCRF, wherein the session information includes the QoS parameter of the bearer supporting the second transmission mode and an indication of changing a core network bearer used for transmitting part of the data which has not been transmitted from the first core network bearer into the bearer supporting the second transmission mode.

In this embodiment, the indication of changing the core network bearer used for transmitting the part of the data which has not been transmitted from the first core network bearer into the bearer supporting the Adaptive Streaming mode included in the session information is specifically an indication of establishing a second core network bearer by using the QoS parameter of the bearer supporting the Adaptive Streaming mode, and the second core network bearer is used for transmitting the part of the data which has not been transmitted.

Step 306, the PCRF receives the information sent by the AF, constructs a new PCC policy according to the session information and sends the new PCC policy to the P-GW.

The PCRF may construct a new PCC policy according to the QoS parameter of the bearer supporting the Adaptive Streaming mode in the session information and the indication of establishing the second core network bearer by using the QoS parameter of the bearer supporting the Adaptive Streaming mode, wherein the new PCC policy includes: the QoS parameter of the bearer supporting the Adaptive Streaming mode, a new charging parameter determined according to the QoS parameter of the bearer supporting the Adaptive Streaming mode, and the like.

Step 307, after receiving the new PCC policy sent by the PCRF, the P-GW implements the new PCC policy through the PCEF in the P-GW, namely, initiates a request of newly establishing a GBR bearer to an S-GW.

The GBR bearer is a type of an EPS bearer and may support the Adaptive Streaming mode.

The request of newly establishing the GBR bearer is a request of newly establishing the second core network bearer. The request of newly establishing the GBR bearer includes the QoS parameter of the bearer supporting the Adaptive Streaming mode.

Step 308, the S-GW forwards the received request of newly establishing the GBR bearer to an MME.

Step 309, the MME sends the request of newly establishing the GBR bearer to a base station.

Step 310, the base station maps the bearer supporting the second transmission mode, namely, the QoS parameter of the second core network bearer into the QoS parameter of a second radio bearer and sends radio resource control connection reconfiguration information to the UE.

The base station maps the QoS parameter of the second core network bearer into the QoS parameter of the second radio bearer, wherein the QoS parameter of the second core network bearer is the QoS parameter of the bearer supporting the Adaptive Streaming mode and is used for identifying the service guarantee correspondingly obtained by the bearer. The QoS parameter of the second radio bearer is bearer service guarantee to be satisfied by radio waves transmitted over the air, for example, delay of delayed transmission, error rate and the like. The QoS parameter of the bearer supporting the Adaptive Streaming mode is mapped into the QoS parameter of the second radio bearer, namely, the QoS parameter of the bearer supporting the Adaptive Streaming mode is transmitted to the QoS parameter of the second radio bearer, and EPS is the same as a radio network bearer in the QoS value.

Since the second radio bearer obtains a new QoS parameter, at this time, the base station needs to reallocate a radio resource according to the QoS parameter of the second radio bearer, for example, reallocating a new bandwidth value, new sending power and the like, the base station sends the radio resource control connection reconfiguration information to the UE, the radio resource control connection reconfiguration information includes information of establishing the second radio bearer, wherein the information of establishing the second radio bearer includes a quality of service parameter supporting the second radio bearer.

Step 311, the UE obtains the second radio bearer according to the radio resource control connection reconfiguration, wherein the QoS parameter of the second radio bearer is different from the QoS parameter of the first radio bearer.

In this embodiment, the UE reestablishes the second radio bearer according to the quality of service parameter supporting the second radio bearer, and activates the established second radio bearer. The QoS parameter of the second radio bearer is different from the QoS parameter of the first radio bearer, including: the bearer type of the second radio bearer is different from the bearer type of the first radio bearer. The QoS parameter of the first radio bearer supports the Progressive Download mode, and the Progressive Download mode is the download mode of the non-GBR bearer. The QoS parameter of the second radio bearer supports the Adaptive Streaming mode, and the Adaptive Streaming mode is the download mode of the GBR bearer.

Step 312, the UE sends radio resource control connection reconfiguration completion information to the base station.

Further, a session management response is established at the non-access layer of the terminal and then is directly sent to the base station.

Step 313, after receiving the radio resource control connection reconfiguration completion information sent by the UE, base station sends a new bearer response message, namely, a bearer establishment response message to the MME; and the base station sends the received session management response sent back by the UE to the MME.

It should be noted that, the new bearer response message in this embodiment is a response message of GBR bearer establishment.

Step 314, after receiving the new bearer response message and the session management response, the MME sends the new bearer response message to the P-GW through the S-GW.

Step 315, the P-GW sends a session modification success message to the AF according to the new bearer response, and the PCRF obtains the session modification success message and sends a session information response message to the AF.

The session information response message is used for indicating that the core network bearer used for transmitting the part of the data which has not been transmitted has been changed from the core network bearer into the bearer supporting the Adaptive Streaming mode, namely, the GBR bearer is used for transmitting the part of the data which has not been transmitted.

Step 316, after receiving the session information response message, the AF sends a mode switch response message to the UE, wherein the mode switch response message is used for indicating mode switch completion.

Step 317, after receiving the mode switch response message sent by the AF, the UE provides a switch response to the switch indication, and transmits the part of the data which has not been transmitted by using the second radio bearer.

In this step, the switch response is used for indicating mode switch completion, at this time, the progressive download mode is switched to the adaptive streaming mode to transmit the part of the data which not been transmitted, namely, the service transmission of the UE is achieved on the GBR bearer.

The embodiment of the present invention provides a method for data transmission, when transmitting data by using the first radio bearer, the second radio bearer is established according to the QoS parameter supporting the second radio bearer, and the second radio bearer is used for a part of the data which has not been transmitted, so that different quality of service parameters are flexibly adopted to transmit data in the data transmission process, in order to adopt different download modes to download a media file in the data transmission process, as a result, the video quality may be improved and the network bandwidth resources are saved.

The embodiment of the present invention provides a method for data transmission, specifically, a progressive download Progressive Download mode is switched to an adaptive streaming Adaptive Streaming mode, wherein in this embodiment, the Progressive Download mode is switched to the Adaptive Streaming mode by modifying the non-GBR bearer of the current Progressive Download mode into the GBR bearer of the Adaptive Streaming mode.

Specific reference may be made to FIG. 3, and the method is described in detail as follows:

step 301, when data by using a first radio bearer, a user equipment UE receives a switch indication.

In this embodiment, the transmitting the data by using the first radio bearer may include: transmitting the data by using the first radio bearer and a first transmission mode. The first transmission mode is a progressive download Progressive Download mode, and the Progressive Download mode is the download mode of a non-guaranteed bit rate non-GBR bearer.

In this embodiment, the switch indication may be an indication sent by a user by operating the UE, and the switch indication is used for indicating the UE to transmit the part of the data which has not been transmitted by using the second transmission mode. For example, the user inputs a command of switching the download mode through an application program interface. The second transmission mode is the adaptive streaming Adaptive Streaming mode, and the Adaptive Streaming mode is the download mode of a guaranteed bit rate GBR bearer. Specifically, in this embodiment, the switch instruction is an instruction of modifying the non-GBR bearer.

In this embodiment, when transmitting the data by using the first transmission mode, namely, the Progressive mode, the user is downloading a video content, and a non-GBR Bearer allocated by a core network is used as a first core network bearer to bear services, in order to achieve the first transmission mode. The first core network bearer and the first radio bearer are corresponding to each other and both support the first transmission mode. At this time, the user hopes to view the video content in real time and sends a switch instruction to the UE by selecting an operating button of the UE, in order to request a network side to transmit the part of the data which has not been transmitted by using the selected Adaptive Streaming mode. For example, the user touches "real-time play" in a display screen of the UE to select the transmission mode, namely, the Adaptive Streaming mode in this embodiment.

When the user sends a mode switch request to an application server through the UE, the background of the UE will firstly download a media presentation description MPD file of the video content, obtain the chip rate of a video fragment and the storage address of the video fragment from the MPD file and then send the mode switch request to the application server. It should be noted that, the MPD is a file for describing media presentation, the entire media content to be downloaded will be divided into a plurality of content fragments with the same duration, each content fragment corresponds to several different chip rates, the chip rate of each content fragment expresses the quality and definition of the media content, the MPD includes the storage addresses of a plurality of fragments with different chip rates, and these fragments with different chip rates may be randomly combined to form an entire content. After being expanded, the MPD includes the chip rate of the video fragment and the storage address of the video fragment necessary for downloading in the second transmission mode.

Step 302, the UE sends a mode switch request message to an application server.

The UE sends the mode switch request message to the application server according to the switch instruction, wherein the mode switch request message is used for requesting the network side to transmit the part of the data which has not been transmitted by using the selected Adaptive Streaming mode.

It should be noted that, the mode switch request message includes a mode switch indication, the chip rate of a video fragment and the storage address of the video fragment. The video fragment herein refers to a fragment of a media file downloaded by the UE.

Optionally, before sending the mode switch request message to the application server, the UE may also construct a quality of service QoS parameter supporting the second radio bearer through the background of the UE according to different media quality types of the second transmission mode selected by the user. A QCI value included in the quality of service QoS parameter of the bearer supporting the second transmission mode includes four parameters: resource type Resource Type, priority priority, packet delay budget Packet Delay Budget and packet error loss rate Packet Error Loss Rate. In this embodiment, the value of the Resource Type is GBR, and afterwards, the QoS value of the current non-GBR bearer is modified into the quality of service QoS parameter of the bearer supporting the second transmission mode.

After the background of the UE constructs the QoS parameter supporting the second radio bearer, the UE sends the mode switch request message to the application server, wherein the mode switch request message includes information of modifying the first radio bearer, and the information of modifying the first radio bearer includes the quality of service parameter supporting the second radio bearer.

Step 303, the AF obtains the mode switch request message sent by the UE;

Optionally, in this step, the AF obtains the mode switch request message sent by the UE to the application server, wherein the mode switch request message includes a mode switch indication, the chip rate of a video fragment and the storage address of the video fragment;

optionally, in this step, the AF obtains the mode switch request message sent by the UE to the application server, wherein the mode switch request message includes the mode switch indication, the chip rate of the video fragment, the storage address of the video fragment and the QoS parameter supporting the second radio bearer.

Step 304, the AF determines a quality of service QoS parameter of a bearer supporting the second transmission mode according to the mode switch request message, wherein the quality of service QoS parameter of the bearer supporting the second transmission mode is different from the QoS parameter of a first core network bearer supporting the first transmission mode.

Optionally, when the mode switch request message intercepted by the AF and sent by the UE includes the mode switch indication, the chip rate of the video fragment and the storage address of the video fragment, the AF determines the quality of service parameter of a bearer supporting the Adaptive Streaming mode according to the mode switch indication and the chip rate of the video fragment included in the mode switch request message.

Optionally, the AF obtains the mode switch request message sent by the UE to the application server, wherein when the mode switch request message includes the mode switch indication, the chip rate of the video fragment, the storage address of the video fragment and the QoS parameter supporting the second radio bearer, the AF has obtained the QoS parameter of the bearer supporting the Progressive Download mode and does not need to reconstruct the QoS parameter of the bearer supporting the Progressive Download mode.

Step 305, the AF sends session information to a policy and charging rules function PCRF, wherein the session information includes the QoS parameter of the bearer supporting the second transmission mode and an indication of changing a core network bearer used for transmitting the part of the data which has not been transmitted from the first core network bearer into the bearer supporting the second transmission mode.

It should be noted that, the QoS parameter of the bearer supporting the Adaptive Streaming mode may be the QoS parameter of a new bearer supporting the Adaptive Streaming mode and constructed by the UE, and may also be the QoS parameter of a new bearer supporting the Adaptive Streaming mode and constructed by the AF.

In this embodiment, the indication of changing the core network bearer used for transmitting the part of the data which has not been transmitted from the first core network bearer into the bearer supporting the Adaptive Streaming mode included in the session information is specifically an indication of modifying the quality of service parameter of the first core network bearer into the quality of service parameter of the bearer supporting the Adaptive Streaming mode, wherein the modified first core network bearer is used for transmitting the part of the data which has not been transmitted.

Step 306, the PCRF receives the session information sent by the AF, constructs a new PCC policy according to the session information and sends the new PCC policy to the P-GW.

The PCRF may construct a new PCC policy according to the QoS parameter of the bearer supporting the Adaptive Streaming mode and constructed in the session information and the indication of modifying the quality of service parameter of the first core network bearer into the quality of service parameter of the bearer supporting the Adaptive Streaming mode, wherein the new PCC policy includes: the QoS parameter of the bearer supporting the Adaptive Streaming mode, a new charging parameter determined according to the QoS parameter of the bearer supporting the Adaptive Streaming mode, and the like.

Step 307, after receiving the new PCC policy sent by the PCRF, the P-GW implements the new PCC policy through the PCEF in the P-GW, namely, initiates a request of modifying the non-GBR bearer to an S-GW.

The request of modifying the non-GBR bearer is a request of modifying the first core network bearer.

The request of modifying the non-GBR bearer includes the QoS parameter of the bearer supporting the Adaptive Streaming mode.

Step 308, the S-GW forwards the received request of modifying the non-GBR bearer to an MME.

Step 309, the MME sends the request of modifying the non-GBR bearer to a base station.

Step 310, the base station maps the QoS parameter of the bearer supporting the second transmission mode into the QoS parameter of a second radio bearer and sends radio resource control connection reconfiguration information to the UE.

The base station modifies the QoS parameter of the bearer supporting the Progressive Download mode, namely, the QoS parameter of the first core network bearer into the QoS parameter of the bearer supporting the Adaptive Streaming mode according to the QoS parameter of the bearer supporting the Adaptive Streaming mode, and maps the modified QoS parameter of the first core network bearer into the QoS parameter of the second radio bearer, wherein the modified QoS parameter of the first core network bearer is the QoS parameter of the bearer supporting the Adaptive Streaming mode and is used for identifying the service guarantee correspondingly obtained by the bearer. The QoS parameter of the second radio bearer is bearer service guarantee to be satisfied by radio waves transmitted over the air, for example, delay of delayed transmission, error rate and the like. The QoS parameter of the bearer supporting the Adaptive Streaming mode is mapped into the QoS parameter of the second radio bearer, namely, the QoS parameter of the bearer supporting the Adaptive Streaming mode is transmitted to the QoS parameter of the second radio bearer, and EPS is the same as a radio network bearer in the QoS value.

Since the second radio bearer obtains a new QoS parameter, at this time, the base station needs to reallocate a radio resource according to the QoS parameter of the second radio bearer, for example, reallocating a new bandwidth value, new sending power and the like. Therefore, the base station sends the radio resource control connection reconfiguration information to the UE, the radio resource control connection reconfiguration information includes information of modifying the first radio bearer, wherein the information of modifying the first radio bearer includes a quality of service parameter supporting the second radio bearer.

Step 311, the UE obtains the second radio bearer according to the radio resource control connection reconfiguration information, wherein the QoS parameter of the second radio bearer is different from the QoS parameter of the first radio bearer.

In this embodiment, the UE modifies the QoS parameter of the first radio bearer according to the QoS parameter supporting the second radio bearer, in order to obtain the second radio bearer, wherein the second radio bearer is the modified first radio bearer. In this embodiment, the QoS parameter of the first radio bearer supports the Progressive Download mode, and the Progressive Download mode is the download mode of the non-GBR bearer. The QoS parameter of the second radio bearer supports the Adaptive Streaming mode, and the Adaptive Streaming mode is the download mode of the GBR bearer;

Step 312, the UE sends radio resource control connection reconfiguration completion information to the base station.

After modifying the QoS parameter of the first radio bearer into the QoS parameter of the second radio bearer, the UE sends a QoS parameter modification completion confirmation message of the first radio bearer to the base station, and then sends the radio resource control connection reconfiguration completion information to the base station.

Further, a session management response is established at the non-access layer of the terminal and then is directly sent to the base station.

Step 313, after receiving the radio resource control connection reconfiguration completion information sent by the UE, the base station sends a response message of QoS modification completion of the first radio bearer to the MME; and the base station sends the received session management response sent back by the UE to the MME.

Step 314, after receiving the response message of QoS modification completion of the first radio bearer and the session management response, the MME sends the response message of QoS modification completion of the first radio bearer to the P-GW through the S-GW.

Step 315, the P-GW sends a session modification success message to the AF according to the response message of QoS modification completion of the first radio bearer, and the PCRF obtains the session modification success message and sends a session information response message to the AF.

The session information response message is used for indicating that the core network bearer used for transmitting the part of the data which has not been transmitted has been changed from the first core network bearer into the bearer supporting the Adaptive Streaming mode, namely, the GBR bearer is used for transmitting the part of the data which has not been transmitted.

Step 316, after receiving the session information response message, the AF sends a mode switch response message to the UE, wherein the mode switch response message is used for indicating mode switch completion.

Step 317, after receiving the mode switch response message sent by the AF, the UE provides a switch response to the switch indication, and transmits the part of the data which has not been transmitted by using the second radio bearer.

In this step, the switch response is used for indicating mode switch completion, at this time, the progressive download mode is switched to the adaptive streaming mode to transmit the part of the data which has not been transmitted, namely, the service transmission of the UE is achieved on the GBR bearer.

The embodiment of the present invention provides a method for data transmission, when transmitting data by using the first radio bearer, the QoS parameter supporting the first radio bearer is modified according to the QoS parameter supporting the second radio bearer, and the second radio bearer is used for transmitting the part of the data which has not been transmitted, so that different quality of service parameters are flexibly adopted to transmit data in the data transmission process, in order to adopt different download modes to download a media file in the data transmission process, as a result, the video quality may be improved and the network bandwidth resources are saved.

Embodiment 3

Figure 4:
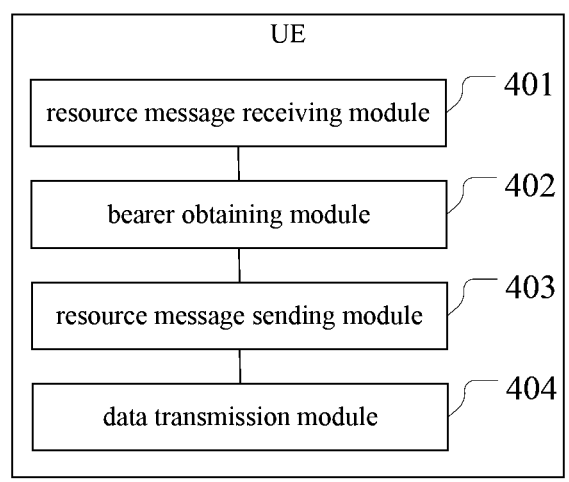
FIG. 4 is a block diagram of an apparatus for data transmission (the apparatus is a UE) provided by embodiment 3 of the present invention.

The embodiment of the present invention provides an apparatus for data transmission, the apparatus may be a user equipment UE, as shown in FIG. 4, the apparatus includes: a resource message receiving module 401, a bearer obtaining module 402, a resource message sending module 403 and a data transmission module 404.

The resource message receiving module 401 is configured to receive radio resource control connection reconfiguration information sent by a base station when transmitting data by using a first radio bearer.

In this embodiment, the transmitting data by using a first radio bearer may include: transmitting the data by using the first radio bearer and a first transmission mode, wherein the first transmission mode is an adaptive streaming Adaptive Streaming mode, the adaptive streaming mode is the download mode of a guaranteed bit rate GBR bearer, or the first transmission mode is a progressive download Progressive Download mode, and the Progressive Download mode is the download mode of a non-guaranteed bit rate non-GBR bearer.

Further, the radio resource control connection reconfiguration information includes information of establishing a second radio bearer, and the information of establishing the second radio bearer includes a quality of service parameter supporting the second radio bearer;

a second transmission mode is the adaptive streaming mode, the adaptive streaming mode is the download mode of the guaranteed bit rate GBR bearer, or the second transmission mode is the progressive download mode, and the Progressive Download mode is the download mode of the non-guaranteed bit rate non-GBR bearer.

It should be noted that, when the first transmission mode is the Adaptive Streaming mode, the second transmission mode is the Progressive Download mode; when the first transmission mode is the Progressive Download mode, the second transmission mode is the Adaptive Streaming mode.

For example, when the second radio bearer is an adaptive streaming mode bearer, the information of establishing the second radio bearer includes a quality of service parameter supporting the adaptive streaming mode bearer, namely, a quality of service parameter supporting the GBR bearer; when the second radio bearer is a progressive download mode bearer, the information of establishing the second radio bearer includes a quality of service parameter supporting the progressive download mode bearer, namely, a quality of service parameter supporting the non-GBR bearer.

Or, the radio resource control connection reconfiguration information includes information of modifying the first radio bearer, and the information of modifying the first radio bearer includes the quality of service parameter supporting the second radio bearer.

For example, when the second radio bearer is the adaptive streaming mode bearer, the first radio bearer is the progressive download mode bearer, and the information of modifying the progressive download mode bearer includes a quality of service parameter supporting the adaptive streaming mode bearer, namely, the information of modifying the non-GBR bearer includes a quality of service parameter supporting the GBR bearer; when the second radio bearer is the progressive download mode bearer, the first radio bearer is the adaptive streaming mode bearer, and the information of modifying the adaptive streaming mode bearer includes a quality of service parameter supporting the progressive download mode bearer, namely, the information of modifying the GBR bearer includes a quality of service parameter supporting the non-GBR bearer.

The bearer obtaining module 402 is configured to obtain the second radio bearer according to the radio resource control connection reconfiguration information, wherein a quality of service parameter of the second radio bearer is different from a quality of service parameter of the first radio bearer.

The quality of service parameter of the second radio bearer is different from the quality of service parameter of the first radio bearer, including: the bearer type of the second radio bearer is different from the bearer type of the first radio bearer.

Further, when the radio resource control connection reconfiguration information includes the information of establishing the second radio bearer, the bearer obtaining module 402 is configured to establish and activate the second radio bearer according to the quality of service parameter supporting the second radio bearer.

When the radio resource control connection reconfiguration information includes the information of modifying the first radio bearer, the bearer obtaining module 402 is configured to modify the quality of service parameter of the first radio bearer according to the quality of service parameter supporting the second radio bearer, and the second radio bearer is the modified first radio bearer.

The quality of service parameter of the first radio bearer supports the first transmission mode, and the quality of service parameter of the second radio bearer supports the second transmission mode.

The resource message sending module 403 is configured to send radio resource control connection reconfiguration completion information to the base station.

The data transmission module 404 is configured to transmit a part of the data which has not been transmitted by using the second radio bearer. At this time, the first radio bearer is switched to the second radio bearer, namely, the non-GBR bearer is used for transmitting the part of the data which has not been transmitted, or the GBR bearer is used for transmitting the part of the data which has not been transmitted.

Figure 5:
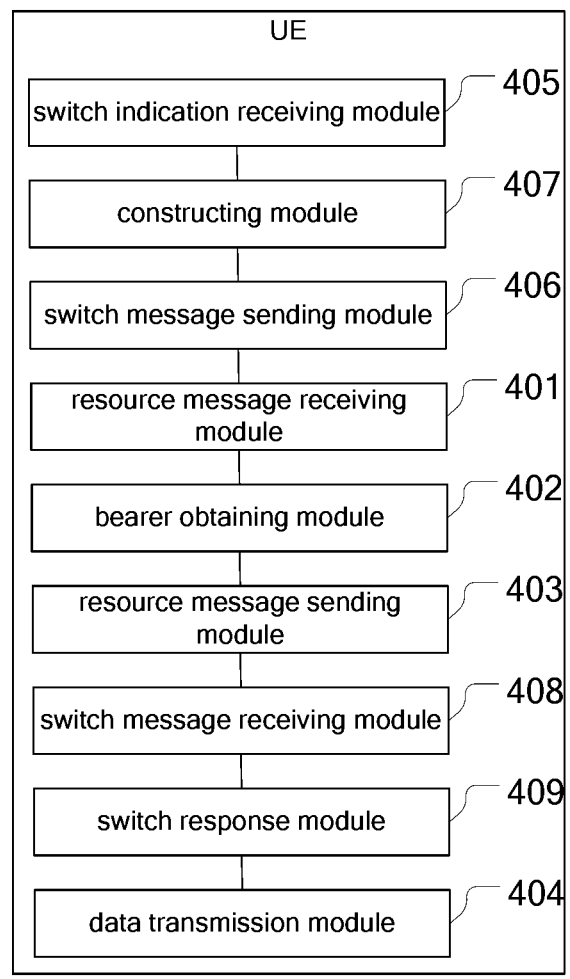
FIG. 5 is a block diagram of another data transmission apparatus (the apparatus is a UE) provided by embodiment 3 of the present invention.

Further optionally, as shown in FIG. 5, the apparatus further includes: a switch indication receiving module 405 and a switch message sending module 406.

Before the resource message receiving module 401 receives the radio resource control connection reconfiguration information sent by the base station, the switch indication receiving module 405 is configured to receive a switch indication, wherein the switch indication is used for indicating the apparatus to transmit the part of the data which has not been transmitted by using the second transmission mode.

The switch indication may be an indication generated by a user by operating the UE, for example, the switch indication may be that the currently adopted adaptive streaming mode is switched to the progressive download mode, and the part of the data which has not been transmitted is transmitted by using the progressive download mode; or the currently adopted progressive download mode is switched to the adaptive streaming mode, and the part of the data which has not been transmitted is transmitted by using the adaptive streaming mode. The switch indication may be a command of switching the download mode input by the user through an application program interface.

After the switch indication receiving module 405 receives the switch indication, the switch message sending module 406 is configured to send a mode switch request message to an application server, wherein the mode switch request message is used for requesting a network side to transmit the part of the data which has not been transmitted by using the second transmission mode.

Further optionally, as shown in FIG. 5, the apparatus further includes a constructing module 407.

When the switch message sending module 406 sends the mode switch request message to the application server, the constructing module 407 constructs the quality of service parameter supporting the second radio bearer according to different media quality types of the second transmission mode selected by the user.

For example, in a data transmission process adopting the first transmission mode, namely, the Adaptive Streaming mode, the user is viewing a video content in real time, and the GBR Bearer allocated by a core network is used as the first core network bearer to bear services, in order to achieve the first transmission mode. The first core network bearer corresponds to the first radio bearer and supports the first transmission mode together with the same. At this time, the user hopes to view a higher-definition video content and sends a switch instruction by selecting an operating button of the UE, in order to request a network side to transmit the part of the data which has not been transmitted by using the selected Progressive Download mode. For example, the user touches "high-definition video" in a display screen of the UE to select the second transmission mode, namely, selecting the Progressive Download mode.

Or, in a data transmission process adopting the first transmission mode, namely, the Progressive Download mode, the user is downloading the video content, and the non-GBR Bearer allocated by the core network is used as the first core network bearer to bear services, in order to achieve the first transmission mode. The first core network bearer corresponds to the first radio bearer and supports the first transmission mode together with the same. At this time, the user hopes to view the video content in real time and sends a switch instruction by selecting an operating button of the UE, in order to request a network side to transmit the part of the data which has not been transmitted by using the selected Adaptive Streaming mode. For example, the user touches "real-time play" in the display screen of the UE to select the second transmission mode, namely, selecting the Adaptive Streaming mode.

It should be noted that, when the switch message sending module 406 sends the mode switch request message, the mode switch request message includes information of modifying the first radio bearer, and the information of modifying the first radio bearer includes the quality of service parameter supporting the second radio bearer.

Further optionally, as shown in FIG. 5, the apparatus further includes a switch message receiving module 408 and a switch response module 409.

The switch message receiving module 408 is configured to receive a mode switch response message sent by an application function AF, wherein the mode switch response message is used for indicating mode switch completion, the AF is configured to obtain the mode switch request message sent by the UE and send the mode switch response message to the UE after mode switch completion.

Further optionally, the switch response module 409 is configured to provide a switch response to the switch indication, wherein the switch response is used for indicating mode switch completion. After the mode switch is completed, the UE transmits the part of the data which has not been transmitted by using the second transmission mode, namely, the UE transmits the part of the data which has not been transmitted by using the adaptive streaming mode, or the UE transmits the part of the data which has not been transmitted by using the progressive download mode.

It should be noted that, in the apparatus as shown in FIG. 4 or FIG. 5, since such contents as the specific implementation processes of the modules, the information interaction between the modules and the like are based on the same inventive concept as the method embodiments of the present invention, reference may be made to the method embodiments, and will not be repeated redundantly herein.

The embodiment of the present invention provides an apparatus for data transmission, when transmitting data by using the first radio bearer through a processing module, the second radio bearer is established according to the QoS parameter supporting the second radio bearer, and the second radio bearer is used for transmitting the part of the data which has not been transmitted, so that different quality of service parameters may be adopted to transmit data in the data transmission process, in order to flexibly adopt different download modes to download a media file in the data transmission process, such that the video quality may be improved and the network bandwidth resources are saved, or the media content may be smoothly played in real time to improve the user experience.

Figure 6:
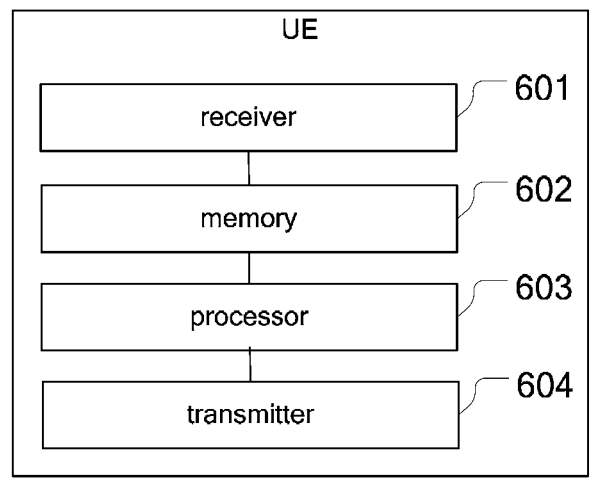
FIG. 6 is a schematic diagram of another data transmission apparatus (the apparatus is UE) provided by embodiment 3 of the present invention.

The embodiment of the present invention provides another data transmission apparatus, the apparatus may be a user equipment UE, as shown in FIG. 6, the apparatus includes: a receiver 601, a memory 602, a processor 603 and a transmitter 604.

The receiver 601 is configured to receive radio resource control connection reconfiguration information sent by a base station when transmitting data by using a first radio bearer.

The memory 602 is configured to store information including a program routine.

The processor 603 is coupled with the memory, the receiver and the transmitter and is configured to control the implementation of the program routine, specifically including: obtaining a second radio bearer according to the radio resource control connection reconfiguration information, wherein the quality of service parameter of the second radio bearer is different from the quality of service parameter of the first radio bearer.

The quality of service parameter of the second radio bearer is different from the quality of service parameter of the first radio bearer, including: the bearer type of the second radio bearer is different from the bearer type of the first radio bearer.

The service of quality parameter of the first radio bearer supports the first transmission mode, and the service of quality parameter of the second radio bearer supports the second transmission mode.

The first transmission mode is an adaptive streaming mode, and the second transmission mode is a progressive download mode; or, the first transmission mode is the progressive download mode, and the second transmission mode is the adaptive streaming mode. The adaptive streaming mode is the download mode of a guaranteed bit rate bearer; the progressive download mode is the download mode of a non-guaranteed bit rate bearer.

The transmitter 604 is configured to send radio resource control connection reconfiguration completion information to the base station.

The processor 603 is further configured to transmit the part of the data which has not been transmitted by using the second radio bearer.

Further optionally, the radio resource control connection reconfiguration information includes information of establishing the second radio bearer, and the information of establishing the second radio bearer includes a quality of service parameter supporting the second radio bearer.

The processor 603 is configured to establish and activate the second radio bearer according to the quality of service parameter supporting the second radio bearer.

Further optionally, the radio resource control connection reconfiguration information includes information of modifying the first radio bearer, and the information of modifying the first radio bearer includes the quality of service parameter supporting the second radio bearer;

the processor 603 is configured to modify the quality of service parameter of the first radio bearer according to the quality of service parameter supporting the second radio bearer, and the second radio bearer is the modified first radio bearer.

Further optionally, before the receiver 601 receives the radio resource control connection reconfiguration information sent by the base station, the receiver 601 is further configured to receive a switch indication, wherein the switch indication is used for indicating the apparatus to transmit the part of the data which has not been transmitted by using the second transmission mode;

the transmitter 604 is further configured to send a mode switch request message to an application server, wherein the mode switch request message is used for requesting a network side to transmit the part of the data which has not been transmitted by using the second transmission mode.

Further optionally, the processor 603 is further configured to, when sending the mode switch request message to the application server, construct the quality of service parameter supporting the second radio bearer according to different media quality types of the second transmission mode selected by the user; the transmitter 604 is further configured to send the information of modifying the first radio bearer to the application server according to the quality of service parameter supporting the second radio bearer.

It should be noted that, the transmitter 604 is configured to send the mode switch request message to the application server, wherein the mode switch request message includes the information of modifying the first radio bearer.

Further optionally, the receiver 601 is further configured to receive a mode switch response message sent by an application function AF, wherein the mode switch response message is used for indicating mode switch completion, and the AF is configured to obtain the mode switch request message sent by the UE and send the mode switch response message to the UE after mode switch completion.

The transmitter 604 is further configured to provide a switch response to the switch indication, wherein the switch response is used for indicating mode switch completion.

It should be noted that, in the apparatus as shown in FIG. 6, since such contents as the specific implementation processes of the modules, the information interaction between the modules and the like are based on the same inventive concept as the method embodiments of the present invention, reference may be made to the method embodiments, and will not be repeated redundantly herein.

The embodiment of the present invention provides an apparatus for data transmission, when transmitting data by using the first radio bearer through the processor, the second radio bearer is established according to the QoS parameter supporting the second radio bearer, and the second radio bearer is used for transmitting the part of the data which has not been transmitted, so that different quality of service parameters are adopted to transmit data in the data transmission process, in order to flexibly adopt different download modes to download a media file in the data transmission process, such that the video quality may be improved and the network bandwidth resources are saved, or the media content may be smoothly played in real time to improve the user experience.

Figure 7:
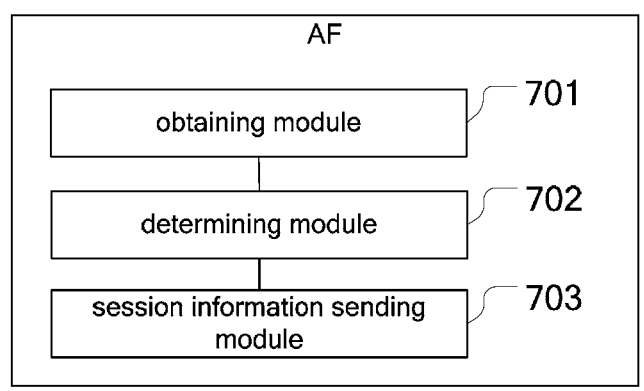
FIG. 7 is a block diagram of an apparatus for data transmission (the apparatus is an AF) provided by embodiment 3 of the present invention.

The embodiment of the present invention provides an apparatus for data transmission, the apparatus may be an application function AF, as shown in FIG. 7, the apparatus includes: an obtaining module 701, a determining module 702 and a session information sending module 703.

The obtaining module 701 is configured to obtain a mode switch request message sent by the UE when a user equipment UE transmits data by using a first transmission mode, wherein the mode switch request message is used for requesting a network side to transmit a part of the data which has not been transmitted by using a second transmission mode.

The first transmission mode is an adaptive streaming Adaptive Streaming mode, and the adaptive streaming mode is the download mode of a guaranteed bit rate GBR bearer, or the first transmission mode is a progressive download Progressive Download mode, and the Progressive Download mode is the download mode of a non-guaranteed bit rate non-GBR bearer.

The second transmission mode is the progressive download Progressive Download mode, and the Progressive Download mode is the download mode of the non-guaranteed bit rate non-GBR bearer, or the second transmission mode is the adaptive streaming Adaptive Streaming mode, and the adaptive streaming mode is the download mode of the guaranteed bit rate GBR bearer.

It should be noted that, when the first transmission mode is the Adaptive Streaming mode, the second transmission mode is the Progressive Download mode; when the first transmission mode is the Progressive Download mode, the second transmission mode is the Adaptive Streaming mode.

It should be noted that, the mode switch request message includes a mode switch indication, the chip rate of a video fragment and the storage address of the video fragment. The video fragment herein refers to a fragment of a media file downloaded by the UE.

The determining module 702 is configured to determine a quality of service parameter of a bearer supporting the second transmission mode according to the mode switch request message, wherein a quality of service parameter of the bearer supporting the second transmission mode is different from a quality of service parameter of a first core network bearer supporting the first transmission mode.

The determining module 702 determines the quality of service parameter of the bearer supporting the adaptive streaming mode or the quality of service parameter of the bearer supporting the progressive download mode according to the mode switch indication and the chip rate of the video fragment included in the mode switch request message.

The session information sending module 703 is configured to send session information to a policy and charging rules function PCRF, wherein the session information includes the quality of service parameter of the bearer supporting the second transmission mode and an indication of changing a core network bearer used for transmitting the part of the data which has not been transmitted from the first core network bearer into the bearer supporting the second transmission mode.

Further optionally, the indication of changing the core network bearer used for transmitting the part of the data which has not been transmitted from the first core network bearer into the bearer supporting the second transmission mode, includes: an indication of modifying the quality of service parameter of the first core network bearer into the quality of service parameter of the bearer supporting the second transmission mode, wherein the modified first core network bearer is used for transmitting the part of the data which has not been transmitted by using a second radio bearer; or, The indication of changing the core network bearer used for transmitting the part of the data which has not been transmitted from the first core network bearer into the bearer supporting the second transmission mode, includes: an indication of establishing a second core network bearer by using the quality of service parameter of the bearer supporting the second transmission mode, and the second core network bearer is used for transmitting the part of the data which has not been transmitted by using the second radio bearer.

Figure 8:
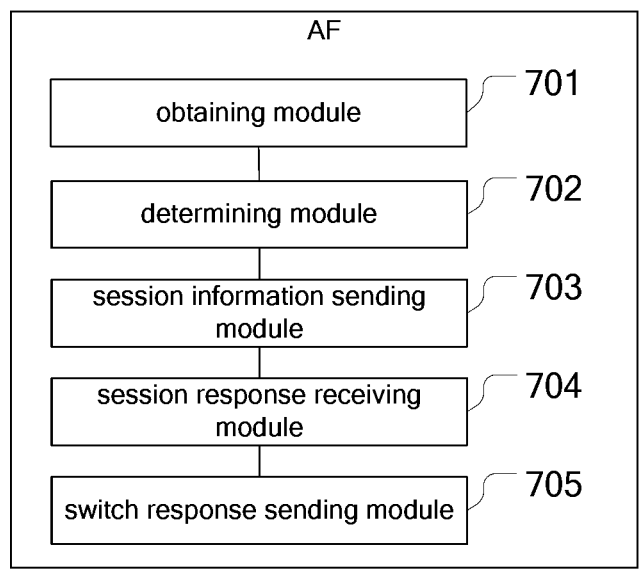
FIG. 8 is a block diagram of another data transmission apparatus (the apparatus is an AF) provided by embodiment 3 of the present invention.

Further optionally, as shown in FIG. 8, the apparatus further includes a session response receiving module 704 and a switch response sending module 705.

After the core network bearer used for transmitting the part of the data which has not been transmitted has been changed from the first core network bearer into the bearer supporting the second transmission mode, the session response receiving module 704 receives a session information response message from the PCRF, wherein the session information response message is used for indicating that the core network bearer used for transmitting the part of the data which has not been transmitted has been changed from the first core network bearer into the bearer supporting the second transmission mode.

The switch response sending module 705 is further configured to send a mode switch response message to the UE, wherein the mode switch response message is used for indicating mode switch completion. After the mode switch is completed, the UE transmits the part of the data which has not been transmitted by using the second transmission mode, namely, the UE transmits the part of the data which has not been transmitted by using the adaptive streaming mode, or the UE transmits the part of the data which has not been transmitted by using the progressive download mode.

It should be noted that, in the apparatus as shown in FIG. 7 or FIG. 8, since such contents as the specific implementation processes of the modules, the information interaction between the modules and the like are based on the same inventive concept as the method embodiments of the present invention, reference may be made to the method embodiments, and will not be repeated redundantly herein.

The embodiment of the present invention provides an apparatus for data transmission, the determining module determines the quality of service parameter of the bearer supporting the second transmission mode according to the mode switch request message obtained by the obtaining module, the sending module sends the session information to the PCRF, wherein the session information includes the quality of service parameter of the bearer supporting the second transmission mode and the indication of changing the core network bearer used for transmitting the part of the data which has not been transmitted from the first core network bearer into the bearer supporting the second transmission mode, so that different quality of service parameters may be flexibly adopted to transmit data in a data transmission process, in order to flexibly adopt different download modes to download a media file in the data transmission process, such that the video quality may be improved and the network bandwidth resources are saved, or the media content may be smoothly played in real time to improve the user experience.

Figure 9:
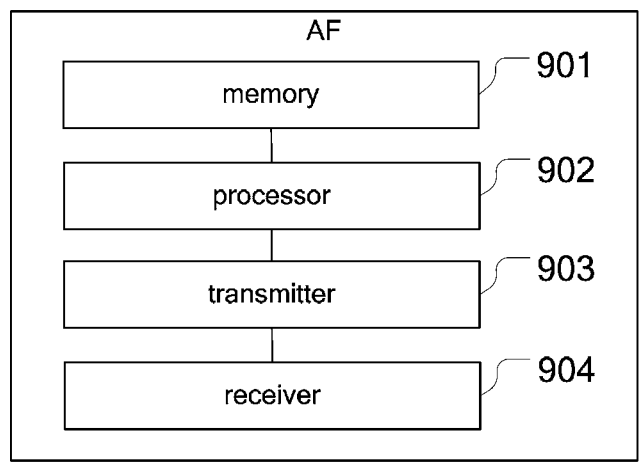
FIG. 9 is a schematic diagram of another data transmission apparatus (the apparatus is an AF) provided by embodiment 3 of the present invention.

The embodiment of the present invention provides another data transmission apparatus, the apparatus may be an application function AF, as shown in FIG. 9, the apparatus includes: a memory 901, a processor 902, a transmitter 903 and a receiver 904.

The memory 901 is configured to store information including a program routine.

The processor 902 is coupled with the memory, the receiver and the transmitter and is configured to control the implementation of the program routine, specifically including: when a user equipment UE transmits data by using a first transmission mode, obtaining a mode switch request message sent by the UE, wherein the mode switch request message is used for requesting a network side to transmit a part of the data which has not been transmitted by using a second transmission mode.

The first transmission mode is an adaptive streaming mode, and the second transmission mode is a progressive download mode; or, the first transmission mode is the progressive download mode, and the second transmission mode is the adaptive streaming mode. The adaptive streaming mode is the download mode of a guaranteed bit rate bearer; the progressive download mode is the download mode of a non-guaranteed bit rate bearer.

The processor 902 is further configured to determine a quality of service parameter of a bearer supporting the second transmission mode according to the mode switch request message, wherein the quality of service parameter of the bearer supporting the second transmission mode is different from the quality of service parameter of a first core network bearer supporting the first transmission mode.

The transmitter 903 is configured to send session information to a policy and charging rules function PCRF, wherein the session information includes the quality of service parameter of the bearer supporting the second transmission mode and an indication of changing a core network bearer used for transmitting the part of the data which has not been transmitted from the first core network bearer into the bearer supporting the second transmission mode.

Further, the indication of changing the core network bearer used for transmitting the part of the data which has not been transmitted from the first core network bearer into the bearer supporting the second transmission mode, includes: an indication of modifying the quality of service parameter of the first core network bearer into the quality of service parameter of the bearer supporting the second transmission mode, wherein the modified first core network bearer is used for transmitting the part of the data which has not been transmitted by using a second radio bearer; or, The indication of changing the core network bearer used for transmitting the part of the data which has not been transmitted from the first core network bearer into the bearer supporting the second transmission mode, includes: an indication of establishing a second core network bearer by using the quality of service parameter of the bearer supporting the second transmission mode, and the second core network bearer is used for transmitting the part of the data which has not been transmitted by using the second radio bearer.

After the core network bearer used for transmitting the part of the data which has not been transmitted has been changed from the first core network bearer into the bearer supporting the second transmission mode, the receiver 904 receives a session information response message from the PCRF, wherein the session information response message is used for indicating that the core network bearer used for transmitting the part of the data which has not been transmitted has been changed from the first core network bearer into the bearer supporting the second transmission mode.

The transmitter 903 is further configured to send a mode switch response message to the UE, wherein the mode switch response message is used for indicating mode switch completion.

It should be noted that, in the apparatus as shown in FIG. 9, since such contents as the specific implementation processes of the modules, the information interaction between the modules and the like are based on the same inventive concept as the method embodiments of the present invention, reference may be made to the method embodiments, and will not be repeated redundantly herein.

The embodiment of the present invention provides an apparatus for data transmission, the processor determines the quality of service parameter of the bearer supporting the second transmission mode according to the obtained mode switch request message, the transmitter sends the session information to the PCRF, wherein the session information includes the quality of service parameter of the bearer supporting the second transmission mode and the indication of changing the core network bearer used for transmitting the part of the data which has not been transmitted from the first core network bearer into the bearer supporting the second transmission mode, so that different quality of service parameters may be flexibly adopted to transmit data in a data transmission process, in order to adopt different download modes to download a media file, such that the video quality may be improved and the network bandwidth resources are saved, or the media content may be smoothly played in real time to improve the user experience.

It should be noted that, the apparatus embodiments described above are merely schematic, wherein the units described as separate components may be separated physically or not, components displayed as units may be physical units or not, namely, may be located in one place, or may also be distributed on a plurality of network units. A part of or all of the modules may be selected to achieve the purposes of the technical solutions in the embodiments according to actual demand. Those of ordinary skill in the art may understand and implement without any creative effort.

By means of the above-mentioned descriptions of the embodiments, those skilled in the art to which the present invention pertains may clearly understand that the present invention may be implemented by software plus necessary universal hardware, and may also be certainly implemented by dedicated hardware, including an application-specific integrated circuit, a dedicated CPU, a dedicated memory, dedicated components and devices and the like, but under most conditions, the former is a better embodiment. Based on this understanding, the technical solutions in the present invention essentially or the part contributing to the prior art may be embodied in the form of a software product, the computer software product may be stored in a readable storage medium, such as a floppy disk of a computer, a USB flash disk, a mobile hard disk drive, a read-only memory (ROM, Read-Only Memory), a random access memory (RAM, Random Access Memory), a magnetic disk, an optical disk or the like, and include several instructions for instructing a computer device (may be a personal computer, a server, or a network device and the like) to perform the methods in the embodiments of the present invention.

The embodiments in the description are described in a progressive manner, the identical or similar parts between the embodiments refer to each other, and what is highlighted in each embodiment is the difference with other embodiments. In particular, for the apparatus and system embodiments, they are basically similar to the method embodiments, thus being described simply, and related parts may see a part of illustration of the method embodiments.

The foregoing descriptions are merely specific embodiments of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. A method for data transmission, comprising:
receiving, by a user equipment (UE), a switch indication, wherein the switch indication is used for directing the UE to transmit data which has not been transmitted by using a second transmission mode; and
sending, by the UE, a mode switch request message to an application server, wherein the mode switch request message is used for requesting a network side to transmit the data which has not been transmitted by using the second transmission mode;
receiving, by the UE, radio resource control connection reconfiguration information sent by a base station when the base station is transmitting data by using a first radio bearer;
obtaining, by the UE, a second radio bearer according to the radio resource control connection reconfiguration information, wherein a quality of service parameter of the second radio bearer is different from a quality of service parameter of the first radio bearer, wherein the quality of service parameter of the first radio bearer supports a first transmission mode, and the quality of service parameter of the second radio bearer supports the second transmission mode;
sending, by the UE, radio resource control connection reconfiguration completion information to the base station; and
transmitting, by the UE, the data which has not been transmitted by using the second radio bearer,
wherein the first transmission mode is an adaptive streaming mode in hyper text transfer protocol (HTTP), and the second transmission mode is a progressive download mode in HTTP.

2. The method of claim 1, wherein the radio resource control connection reconfiguration information comprises information of establishing the second radio bearer, the information of establishing the second radio bearer comprises the quality of service parameter of the second radio bearer, and
 wherein the obtaining, by the UE, a second radio bearer, comprises:
  establishing and activating, by the UE, the second radio bearer according to the quality of service parameter of the second radio bearer.

3. The method of claim 1, wherein the radio resource control connection reconfiguration information comprises information of modifying the first radio bearer, the information of modifying the first radio bearer comprises the quality of service parameter of the second radio bearer, and the obtaining, by the UE, a second radio bearer, comprises:
  modifying, by the UE, the first radio bearer according to the quality of service parameter of the second radio bearer, wherein the second radio bearer is the modified first radio bearer.

4. The method of claim 1, wherein the mode switch request message comprises the quality of service parameter of the second radio bearer, and the method further comprises:
  constructing, by the UE, the quality of service parameter of the second radio bearer according to different media quality types of the second transmission mode selected by a user.

5. The method of claim 4, further comprising:
  receiving, by the UE, a mode switch response message sent by an application function (AF), wherein the mode switch response message is used for indicating mode switch completion.

6. An apparatus for data transmission, comprising a receiver, a memory, a processor and a transmitter, wherein:
  the receiver is configured to receive a switch indication, wherein the switch indication is used for directing the UE to transmit data which has not been transmitted by using a second transmission mode;
  the transmitter is configured to send a mode switch request message to an application server, wherein the mode switch request message is used for requesting a network side to transmit the data which has not been transmitted by using the second transmission mode;
  the receiver is further configured to receive radio resource control connection reconfiguration information sent by a base station when transmitting data by using a first radio bearer;
  the memory is configured to store information including a program routine,
  the processor is coupled with the memory, the receiver and the transmitter and is configured to control the implementation of the program routine, including obtaining a second radio bearer according to the radio resource control connection reconfiguration information, wherein a quality of service parameter of the second radio bearer is different from a quality of service parameter of the first radio bearer, wherein the quality of service parameter of the first radio bearer supports a first transmission mode, and the quality of service parameter of the second radio bearer supports the second transmission mode;
  the transmitter is configured to send radio resource control connection reconfiguration completion information to the base station; and
  the transmitter is further configured to transmit the data which has not been transmitted by using the second radio bearer, and
 wherein the first transmission mode is an adaptive streaming mode in hyper text transfer protocol (HTTP), and the second transmission mode is a progressive download mode in HTTP.

7. The apparatus of claim 6, wherein the radio resource control connection reconfiguration information comprises information of establishing the second radio bearer, and the information of establishing the second radio bearer comprises the quality of service parameter of the second radio bearer; and
  the processor is configured to establish and activate the second radio bearer according to the quality of service parameter of the second radio bearer.

8. The apparatus of claim 6, wherein the radio resource control connection reconfiguration information comprises information of modifying the first radio bearer, and the information of modifying the first radio bearer comprises the quality of service parameter of the second radio bearer; and
  the processor is configured to modify the first radio bearer according to the quality of service parameter of the second radio bearer, wherein the second radio bearer is the modified first radio bearer.

9. The apparatus of claim 8, wherein the mode switch request message comprises the quality of service parameter of the second radio bearer, and the processor is further configured to construct the quality of service parameter of the second radio bearer according to different media quality types of the second transmission mode selected by a user.

10. The apparatus of claim 9, wherein
  the receiver is further configured to receive a mode switch response message sent by an application function (AF), wherein the mode switch response message is used for indicating mode switch completion.

11. An apparatus for data transmission, comprising a memory, a processor, and a transmitter, wherein
  the memory is configured to store information including a program routine;
  the processor is coupled with the memory and the transmitter and is configured to control an implementation of the program routine including obtaining a mode switch request message sent by a user equipment (UE) when the UE transmits data by using a first transmission mode, wherein the mode switch request message is used for requesting a network side to transmit a part of the data which has not been transmitted by using a second transmission mode;
  the processor is further configured to determine a quality of service parameter of a bearer supporting the second transmission mode according to the mode switch request message, wherein the quality of service parameter of the bearer supporting the second transmission mode is different from a quality of service parameter of a first core network bearer supporting the first transmission mode; and
  the transmitter is configured to send session information to a policy and charging rules function (PCRF), wherein the session information comprises the quality of service parameter of the bearer supporting the second transmission mode and an indication of changing a core network bearer used for transmitting the part of the data which has not been transmitted from the first core network bearer into the bearer supporting the second transmission mode.

12. The apparatus of claim 11, wherein the indication of changing the core network bearer used for transmitting the part of the data which has not been transmitted from the first core network bearer into the bearer supporting the second transmission mode, comprises:

an indication of modifying the quality of service parameter of the first core network bearer into the quality of service parameter of the bearer supporting the second transmission mode, wherein the modified first core network bearer is used for transmitting the part of the data which has not been transmitted by using a second radio bearer.

13. The apparatus of claim 11, wherein the indication of changing a core network bearer used for transmitting the part of the data which has not been transmitted from the first core network bearer into the bearer supporting the second transmission mode, comprises:

an indication of establishing a second core network bearer by using the quality of service parameter of the bearer supporting the second transmission mode, wherein the second core network bearer is used for transmitting the part of the data which has not been transmitted by using the second radio bearer.

14. The apparatus of claim 11, further comprising:

a receiver, configured to receive a session information response message from the PCRF, wherein the session information response message is used for indicating that the core network bearer used for transmitting the part of the data which has not been transmitted has been changed from the first core network bearer into the bearer supporting the second transmission mode; and the transmitter is further configured to send a mode switch response message to the UE, wherein the mode switch response message is used for indicating mode switch completion.

* * * * *